(12) United States Patent
Karasawa et al.

(10) Patent No.: US 6,668,648 B2
(45) Date of Patent: Dec. 30, 2003

(54) ACCELERATION DETECTION TYPE GYRO DEVICE

(75) Inventors: Satoshi Karasawa, Aichi-ken (JP); Takao Murakoshi, Tochigi-ken (JP); Keisuke Fukatsu, Tochigi (JP)

(73) Assignee: Tokimec Inc., Tokyo (JP)

( * ) Notice: Subject to any disclaimer, the term of this patent is extended or adjusted under 35 U.S.C. 154(b) by 0 days.

(21) Appl. No.: 10/204,659

(22) PCT Filed: Feb. 23, 2001

(86) PCT No.: PCT/JP01/01313
§ 371 (c)(1),
(2), (4) Date: Jan. 2, 2003

(87) PCT Pub. No.: WO01/63207
PCT Pub. Date: Aug. 30, 2001

(65) Prior Publication Data
US 2003/0121328 A1 Jul. 3, 2003

(30) Foreign Application Priority Data
Feb. 23, 2000 (JP) .......................................... 2000-46215

(51) Int. Cl.[7] .............................................. G01C 19/00
(52) U.S. Cl. .................................................. 73/504.08
(58) Field of Search .......................... 73/504.08, 504.02

(56) References Cited

U.S. PATENT DOCUMENTS

| 4,061,043 A | 12/1977 | Stiles |
|---|---|---|
| 5,353,656 A | 10/1994 | Hawkey et al. |
| 5,698,783 A | 12/1997 | Murakoshi et al. |
| 5,920,983 A | 7/1999 | Murakoshi et al. |

FOREIGN PATENT DOCUMENTS

| JP | 8-320231 | 12/1996 |
|---|---|---|
| JP | 8-320232 | 12/1996 |

*Primary Examiner*—Richard A. Moller
(74) *Attorney, Agent, or Firm*—Frommer Lawrence & Haug LLP; William S. Frommer

(57) ABSTRACT

An acceleration-detecting type gyro apparatus of an electrostatic supporting type, in which displacements of a gyro rotor are actively made zero is proposed. The acceleration-detecting type gyro apparatus includes: a gyro case; a gyro rotor which is supported within the gyro case by electrostatic supporting forces such that the gyro rotor is not in contact with the gyro case; electrostatic supporting electrodes for generating the electrostatic supporting forces; a rotor drive system for rotating the gyro rotor around the spin axis at high speed; a displacement-detection system for detecting displacements of the gyro rotor; and a restraining system having a feedback loop for correcting control voltages applied to the electrostatic supporting electrodes so that displacements of the gyro rotor become zero, the gyro rotor is annular-shaped, and the electrostatic supporting electrodes are disposed in a manner of surrounding the gyro rotor.

7 Claims, 12 Drawing Sheets

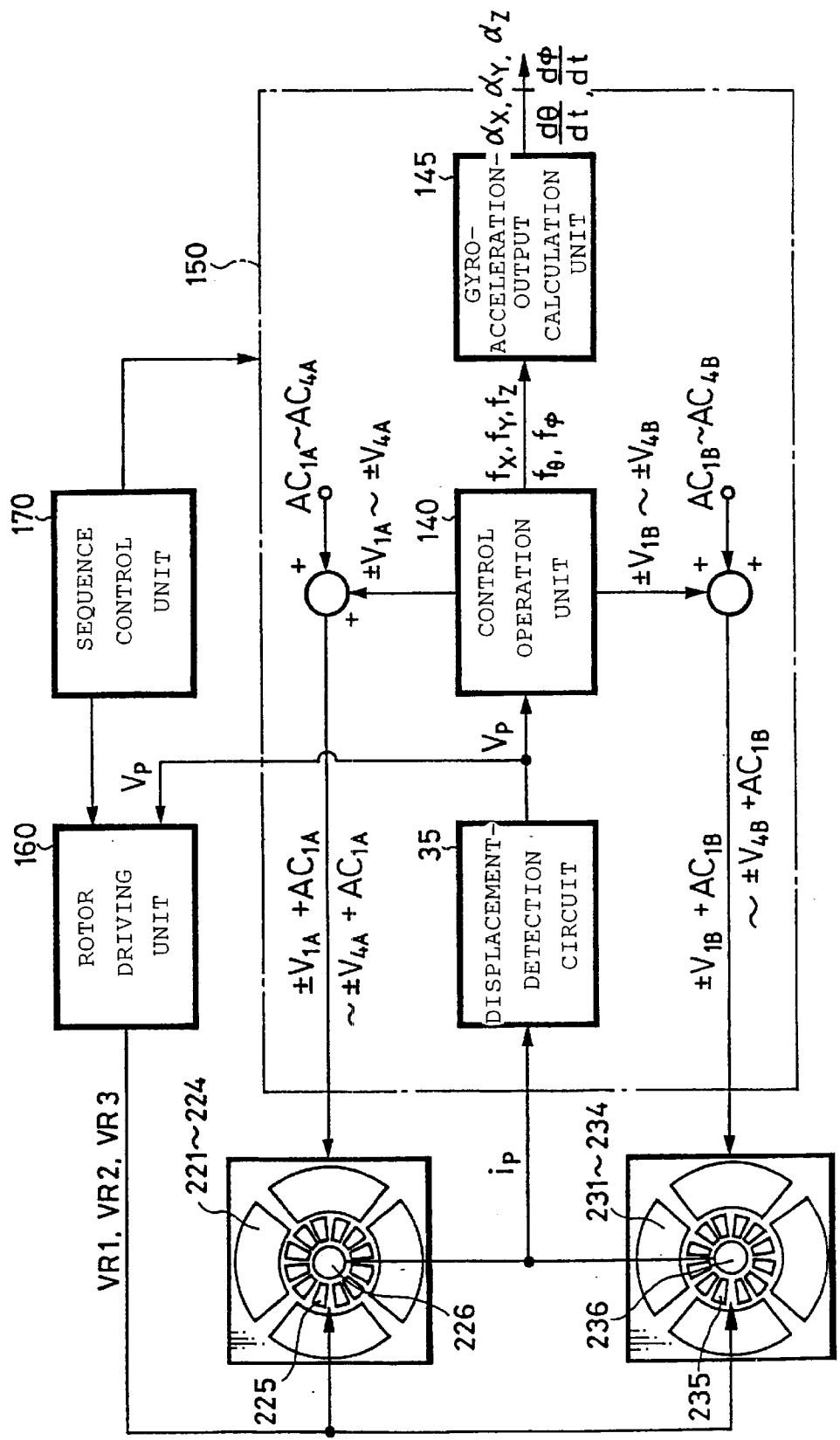

FIG. 4   RESTRAINING CONTROL SYSTEM

FIG. 6
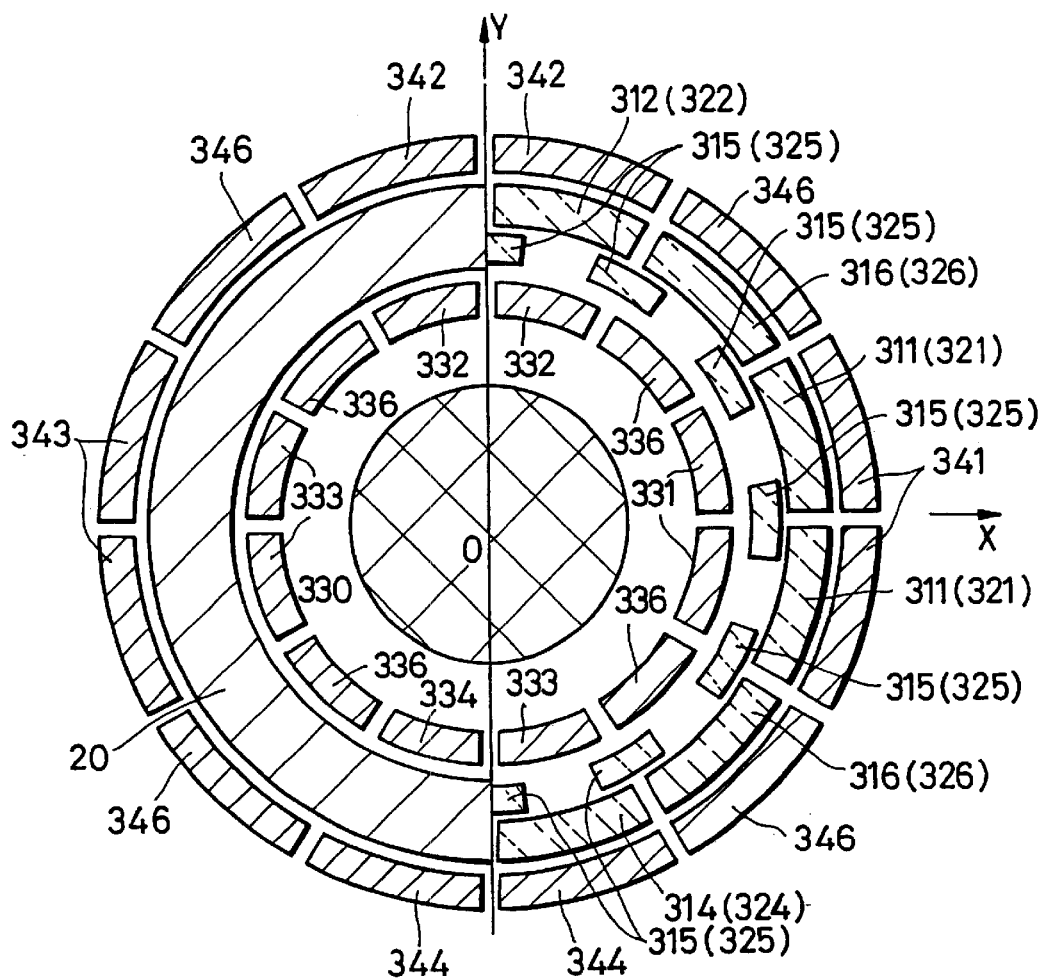
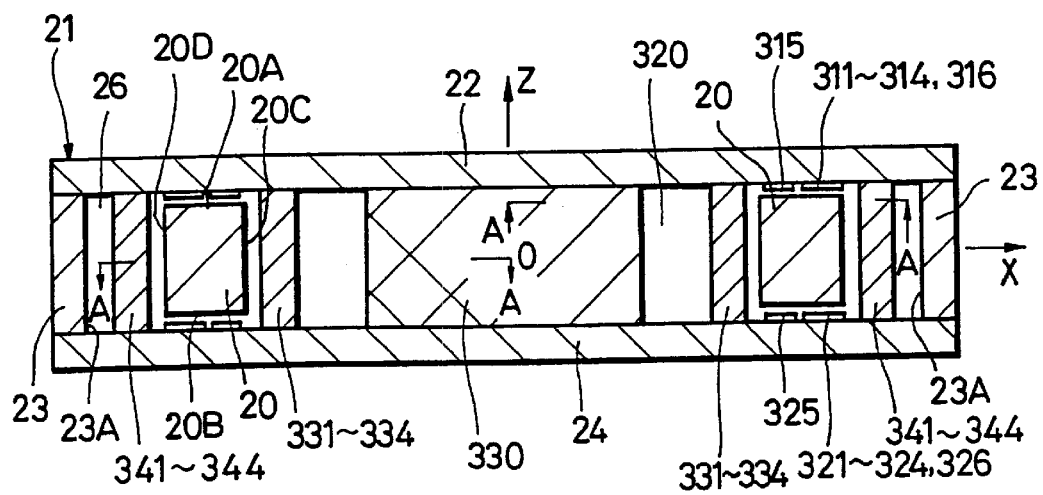

ACCELERATION DETECTION TYPE GYRO DEVICE

TECHNICAL FIELD

The present invention relates to an acceleration-detecting type gyro apparatus, which is suitable for use in mobile objects such as automobiles, ships, or airplanes, for detecting an angular velocity, or angular change, and acceleration relative to the inertial space. More particularly, the present invention relates to an extremely small acceleration-detecting type gyro apparatus in which a gyro rotor is being supported by electrostatic supporting forces in a floating state.

BACKGROUND ART

Referring to FIG. 1 to FIG. 5, an example of a conventional gyro apparatus will be described. This gyro apparatus has been disclosed in the Japanese published application No. HEI-7 (1995)-125345, filed on May 24, 1995 by the same applicant as the present application. Refer to the above application for the detailed description.

Referring to FIG. 1, this gyro apparatus will be described. The gyro apparatus comprises: a thin disk-like gyro rotor 20; and a gyro case 21 with the gyro rotor 20 housed therein.

XYZ coordinates for the gyro apparatus are set as shown in the figure. The Z axis is set upwardly along the central axis of the gyro apparatus, and the X axis and the Y axis are set perpendicular to the above Z axis. A spin axis of the gyro rotor 20 is disposed along the Z axis.

As shown in FIG. 1A, the gyro case 21 comprises: an upper bottom member 22, a lower bottom member 24, and a spacer 23 which connects the both, and the spacer 23 has an inner annular wall 23A. Thus, a disk-like closed cavity 26 in which the gyro rotor 20 is housed is formed within the gyro case 21 with the inner surfaces of the upper bottom member 22 and the lower bottom member 24, and the inner wall 23A of the spacer 23. The cavity 26 has been evacuated by a suitable method.

A concave portion 23B is formed outside of the inner annular wall 23A of the spacer 23, and the concave portion 23B is connected to the cavity 26 through a passage 23C. The height of the passage 23C may be from 2 to 3 micrometers. A getter 33 is disposed in the above concave portion 23B, whereby it is possible to maintain the cavity 26 at a high degree of vacuum for a long period of time.

The gyro rotor 20 is formed with a conductive material. For example, single crystal silicon may be used as such conductive material. By using the single crystal material, a gyro rotor with less thermal deformation, smaller influence by secular change, and higher accuracy may be provided. The upper bottom member 22 and the lower bottom member 24 of the gyro case 21 are formed with a non-conductive material, for example, with glass. The spacer 23 may be formed with the same material as that of the gyro rotor 20.

As shown in the right halves of FIGS. 1A and 1B, a plurality of annular electrode portions 200A, 200B, 200C, 200D; and 200A', 200B', 200C', 200D' are concentrically formed on the upper surface and the lower surface of the gyro rotor 20. Specifically, a plurality of annular grooves 200a, 200b, 200c, 200d; and 200a', 200b', 200c', 200d' are concentrically formed on the upper and lower surfaces, whereby protruding annular electrode portions are formed.

Driving electrode portions 200E, 200E' are formed at the inner side of the annular electrode portions 200A, 200B, 200C, 200D; and 200A', 200B', 200C', 200D' on the upper and lower surfaces of the gyro rotor 20. The driving electrode portions 200E, 200E' are formed between two concentric annular grooves 200d, 200e; and 200d', 200e' as a plurality of sectorial protruding portions, and may be annularly disposed in a row along the circumference.

Displacement-detection electrode portions 200F and 200F' are formed in the center portion, that is, at the inner side of the driving electrode portions 200E and 200E' on the upper and lower surfaces of the gyro rotor 20. Concave portions 200f, 200f' are formed in the center portion of the above displacement-detection electrode portions 200F, 200F'.

The annular electrode portions 200A, 200B, 200C, 200D and 200A', 200B', 200C', 200D'; the driving electrode portions 200E, 200E'; and the displacement-detection electrode portions 200F, 200F', all of which are formed as a protruding portion on the upper, and lower surfaces of the gyro rotor 20, may be formed coplanar with each other.

On the other hand, as shown in the left halves of FIGS. 1A and 1B, at least three pairs of electrostatic supporting electrodes, in the present example, a first, second, third, and fourth pairs of electrostatic supporting electrodes 221, 231, 222, 232, 223, 233, and, 224, 234 are disposed on the inner surface of the upper bottom member 22 and the lower bottom member 24 of the gyro case 21. The four pairs of electrostatic supporting electrodes are spaced with every ninety-degree to each other along the circumferential direction. For example, the first and third pairs of the electrostatic supporting electrodes 221, 231, and, 223, 233 are disposed along the X axis, and the second and fourth pairs of electrostatic supporting electrodes 222, 232, and, 224, 234 are disposed along the Y axis.

Individual electrostatic supporting electrodes comprise a pair of comb-shaped portions. For example, the electrostatic supporting electrode 223, which is formed on the inner surface of the upper bottom member 22, in the third pair of electrostatic supporting electrodes 223, 233 is shown on the left side of FIG. 1B. This electrostatic supporting electrode 223 includes two comb-shaped portions 223-1, 223-2 spaced apart from each other, and the above two comb-shaped portions are spaced apart from each other.

One comb-shaped portion 223-1 comprises a radius portion 223R extending in the radial direction, and a plurality of circumference portions 223A, 223C extending in the circumferential direction. Similarly, the other comb-shaped portion 223-2 comprises a radius portion 223R extending in the radial direction, and a plurality of circumference portions 223B, 223D extending in the circumferential direction. The circumference portions 223A, 223C; and 223B, 223D of individual comb-shaped portions 223-1, 223-2 are alternately disposed. Terminal portions 223R', 223R' are formed at the edge of the radius portions 223R, 223R of the comb-shaped portions 223-1, 223-2, respectively.

Driving electrodes 225, 235 are formed on the inner side of four pairs of electrostatic supporting electrodes 221, 231, 222, 232, 223, 233, and, 224, 234 on the inner surface of the upper bottom member 22 and the lower bottom member 24 of the gyro case 21, respectively. The above driving electrode 225, 235 may be configured to be a plurality of sectors which are annularly disposed in a row along the circumference.

Displacement-detection electrodes 226, 236 are formed in the center portion, that is, on the inner side of the driving electrodes 225, 235 on the inner surfaces of the upper bottom member 22 and the lower bottom member 24 of the gyro case 21.

Hereinafter, sizes and relative positions between the annular electrode portions 200A, 200B, 200C, 200D and 200A', 200B', 200C', 200D' of the gyro rotor 20; and the electrostatic supporting electrodes 221, 222, 223, 224, and 231, 232, 233, 234 of the upper bottom member 22 and lower bottom member 24 of the gyro case 21 will be described.

With regard to the gyro rotor 20, the outer diameter D, the thickness t, and the mass may be 5 mm or less, 0.1 mm or less, and 10 milligrams or less, respectively. Four annular electrode portions 200A, 200B, 200C, 200D; and 200A', 200B', 200C', 200D' are shown in FIG. 1. However, a number of annular electrode portions are formed in actual practice. For example, when the width L of each electrode portion in the radial direction is about 10 micrometers, and the above electrode portions are formed at an equal pitch of about 20 micrometers, about 100 annular electrode portions are formed in an annular area with a width of about 2 mm along the radial direction. Here, the width L of each electrode portion and the pitch between the potions in the radial direction are preferably as small as production methods will permit.

The sizes of the electrostatic supporting electrodes 221, 222, 223, 224, and 231, 232, 233, 234 of the upper bottom member 22 and the lower bottom member 24 of the gyro case 21 may be determined corresponding to those of the annular electrode portions 200A, 200B, 200C, 200D; and 200A', 200B', 200C', 200D'. For example, as shown in FIG. 1, the circumference portions 223A, 223C; and 223B, 223D of individual comb-shaped portions 223-1, 223-2 of the third electrostatic supporting electrode 223 are described under assumption that the number of the above circumference portions is four. However a number of circumference portions are formed in actual practice. For example, when the width L of each circumference portion in the radial direction is about 10 micrometers, and the above circumference portions are formed at an equal pitch of about 20 micrometers, about 100 circumference portions are formed in an annular area having a width of about 2 mm along the radial direction.

Hereinafter, relations between positions of the electrode portions of the gyro rotor 20 and the electrostatic supporting electrodes of the gyro case 21 will be described. For example, the relations between positions of the electrode portions 200A, 200B, 200C, 200D; and 200A', 200B', 200C', 200D' of the gyro rotor 20, and the third pair of electrostatic supporting electrodes 223, 233 will be described. The first circumference portions 223A, 233A of the third pair of the electrostatic supporting electrodes 223, 233 are corresponding to the first electrode portion 200A, 200A' of the gyro rotor 20, and the second circumference portions 223B, 233B of the third pair of the electrostatic supporting electrodes 223, 233 are corresponding to the second electrode portions 200B, 200B'. Similarly, the third and fourth circumference portions 223C, 233C; and 223D, 233D are corresponding to the third and fourth electrode portions 200C, 200C'; and 200D, 200D', respectively.

The space δ between the electrode portions of the gyro rotor 20 and the corresponding electrostatic supporting electrodes of the gyro case 21 may be several micrometers, for example, δ=2 to 3 micrometers.

Each electrode portion 200A, 200B, 200C, 200D; and 200A', 200B', 200C', 200D' of the gyro rotor 20 are concentrically disposed relative to the corresponding circumference portions 223A, 233A, 223B, 233B, 223C, 233C; and 223D, 233D of the electrostatic supporting electrodes 223, 233, and, at the same time, they are disposed inwardly or outwardly deviated in the radial direction.

For example, the width and the pitch of each electrode portion 200A, 200B, 200C, 200D; and 200A', 200B', 200C', 200D ' of the gyro rotor 20 are equal to those of circumference portions 223A, 233A, 223B, 233B, 223C, 233C; and 223D, 233D of the electrostatic supporting electrode 223, 233, and the both are disposed, inwardly or outwardly deviated from each other in the radial direction by a predetermined distance.

The reason why the electrostatic supporting electrodes according to the present example are alternately disposed will be described. According to the above described configuration, the capacitance between each pair of the comb-shaped portions and the corresponding electrode portions of the gyro rotor 20 is equal on the upper and lower sides of the gyro rotor 20. For example, the capacitance between the first comb-shaped portions 221-1 (221A, 221C) and the corresponding first and third electrode portions 200A, 200C of the gyro rotor 20 is equal to that between the second comb-shaped portions 221-2 (221B, 221D) and the corresponding second and third electrode portions 200C, 200D of the gyro rotor 20 at the first electrostatic supporting electrode 221 in the first pair of the electrostatic supporting electrodes 221, 231, and the value of the capacitance is $C_{1A}$.

Therefore, the electric potential of the gyro rotor 20 may be always adjusted to zero by setting both the control direct-current voltage applied to the first comb-shaped portion 221-1 (221A, 221C) and the control direct-current voltage applied to the second comb-shaped portion 221-2 (221B, 221D) to be the voltage which has the same magnitude and different polarities, for example, $\pm V_{1A}$. Referring to FIG. 4, the above setting will be later described again.

The second electrostatic supporting electrode 231 in the first pair of electrostatic supporting electrodes 221, 231 will be the same as described above. Moreover, the second, third, and fourth electrostatic supporting electrodes 222, 232, 223, 233, and 224, 234, are also the same as described above.

Here, the driving electrode portions 200E, 200E', and displacement-detection electrode portions 200F, 200F' of the gyro rotor 20, and the corresponding driving electrode 225, 235, and displacement-detection electrode 226, 236 of the gyro case 21 may be shaped in the same manner and disposed at the same position with each other in the radial direction.

Dischargeable stoppers 127, 128 are respectively provided at the central portion of the inner surfaces of the upper bottom member 22 and the lower bottom member 24 of the gyro case 21, that is, in the central portion of the displacement-detection electrodes 226, 236, respectively. The above stoppers 127, 128 are disposed corresponding to the concave portions 200f, 200f' formed in the central portion of the upper and lower surfaces of the gyro rotor 20.

The dischargeable stoppers 127, 128 are provided so that the displacement in the Z-axis direction, and the displacement in the X-axis and Y-axis directions of the gyro rotor 20 are restrained; the gyro rotor 20 is prevented from being contact with the inner surface of the gyro case 21; and, at the same time, electrostatic charges which have been accumulated in the gyro rotor 20 are discharged.

When the gyro rotor 20 is displaced in the Z-axis direction to approach the inner surface of the gyro case 21, the dischargeable stoppers 127, 128 come in contact with the bottom of the concave portions 200f, 200f' of the gyro rotor 20 before the electrode portion of the gyro rotor 20 comes into contact with the electrode of the gyro case 21. Moreover, when the gyro rotor 20 is displaced in the X-axis or Y-axis direction, the dischargeable stoppers 127, 128 come in contact with the circumferential inner surfaces of the concave portions 200f, 200f' of the gyro rotor 20 before the gyro rotor 20 comes into contact with the circumferential inner wall 23A of the gyro case 21.

Accordingly, the gyro rotor 20 is restrained from being displaced in the Z-axis direction, the X-axis direction, and the Y-axis direction, and the gyro rotor 20 is prevented from being contact with the inner surface of the gyro case 21. Further, when the gyro rotor 20 is stopped and grounded, the dischargeable stoppers 127, 128 come in contact the concave portions 200f, 200f' of the gyro rotor 20, whereby electrostatic charge accumulated in the gyro rotor 20 is discharged to the outside through the dischargeable stoppers 127, 128.

The electrostatic supporting electrodes 221, 231, 222, 232, 223, 233, and 224, 234; the driving electrodes 225, 235; and the displacement-detection electrodes 226, 236, all of which are formed on the upper bottom member 22 or the lower bottom member 24 of the gyro case 21, may be electrically connected to an external power source, or an external circuit by through hole connection. Small holes, that is, through holes are provided in the upper bottom member 22 or the lower bottom member 24, and metal films are formed on the inner surface of the through holes. The electrostatic supporting electrodes, the driving electrodes, and the displacement-detection electrodes are connected to an external power source or an external circuit by the above metal films.

A preamplifier 35, for example, a field-effect type transistor is disposed on the outer surface of the upper bottom member 22, and the above preamplifier 35 is connected to the displacement-detection electrodes 226, 236 as shown in FIG. 1A. Through holes 22A (only a through hole 22A provided on the upper bottom member 22 is shown in the figure) are provided on the upper bottom member 22 and the lower bottom member 24, and the preamplifier 35 is connected to the displacement-detection electrodes 226, 326 by the thin metal film formed on the inner surface of the above through hole 22A.

Furthermore, each of the pair of comb-shaped portions is electrically connected, as described later referring to FIG. 3. Accordingly, for example, through holes 22B (only one through hole is shown in the figure) are provided, corresponding to each of the terminal portions 223R', 223R' of the comb-shaped portions 223-1, 223-2 of the first electrostatic supporting electrode 223 in the third pair of the electrodes, and a thin metal film formed on the inner surface of the above through hole 22B is connected to a common terminal provided outside of the upper bottom member 22, whereby the terminal portion 223R', 223R' of two comb-shaped portions 223-1, 223-2 are electrically connected. Similarly, through holes 24A (only one through hole is shown in the figure) are provided, corresponding to each of the terminal portions 231R', 231R' of the comb-shaped portions 231-1, 231-2 of the second electrostatic supporting electrode 231 in the first pair of the above electrodes, and a thin metal film formed on the inner surface of the through hole 24A is connected to a common terminal provided outside of the lower bottom member 24, whereby the terminal portion 231R', 231R' of two comb-shaped portions 231-1, 231-2 are electrically connected.

FIG. 2 shows an example of a control loop of the gyro apparatus. The control loop according to the present example comprises a restraining control system including a restraining control unit 150, a rotor drive system including a rotor driving unit 160, and a sequence control unit 170.

The restraining control unit 150 in the present example comprises: a displacement-detection circuit, that is, a preamplifier 35, by which a displacement-detection electric current $i_P$ is detected, and the detected current is converted into a displacement-detection voltage $V_P$; and a control operation unit 140 to which the above displacement-detection voltage $V_P$ is input, and control direct current voltages $\pm V_{1A}$ through $\pm V_{4A}$, $\pm V_{1B}$ through $\pm V_{4B}$ are generated. Displacement-detection alternating-current voltages $AC_{1A}$ through $AC_{4A}$, $AC_{1B}$ through $AC_{4B}$ are added to the control direct-current voltages $\pm V_{1A}$ through $\pm V_{4A}$, $\pm V_{1B}$ through $\pm V_{4B}$, which have been output by the control operation unit 140, and the voltages after the addition are supplied to the electrostatic supporting electrodes 221 through 224, 231 through 234. Further, the gyro apparatus according to the present example is provided with a gyro-acceleration-output calculation unit 145, to which an output signal from the control operation unit 140 is input.

The gyro rotor 20 is supported and restrained in a floating state at a predetermined reference position by applying the control direct-current voltages $\pm V_{1A}$ through $\pm V_{4A}$, $\pm V_{1B}$ through $\pm V_{4B}$ to the electrostatic supporting electrodes 221 through 224, 231 through 234. The displacement-detection electric current $i_P$ flows through the displacement-detection electrodes 226, 236 which are formed on the inner surface of the gyro case 21 by applying the displacement-detection alternating-current voltages $AC_{1A}$ through $AC_{4A}$, $AC_{1B}$ through $AC_{4B}$ to the electrostatic supporting electrodes 221 through 224, 231 through 234. The above displacement-detection electric current $i_P$ is converted into the voltage signal $V_P$ by the preamplifier 35. The above voltage signal $V_P$ includes all the linear displacements and the rotational displacements of the gyro rotor 20.

The control operation unit 140 detects a displacement $\pm \Delta X$ in the X-axis direction, a displacement $\pm \Delta Y$ in the Y-axis direction, and a displacement $\pm \Delta Z$ in the Z-axis direction, and a rotational displacement $\Delta\theta$ and $\Delta\phi$ around the Y axis and the X axis of the gyro rotor 20 (The direction of the arrow shown in the upper right of FIG. 3 is assumed to be positive), using the voltage signal $V_P$. Further, the control direct-current voltages $\pm V_{1A}$ through $\pm V_{4A}$, $\pm V_{1B}$ through $\pm V_{4B}$ required to the electrostatic supporting electrodes 221 through 224, 231 through 234 are calculated, using the above displacements. Thus, the control direct-current voltages $\pm V_{1A}$ through $\pm V_{4A}$, $\pm V_{1B}$ through $\pm V_{4B}$ are changed, and the gyro rotor 20 is returned to the original position so that an amount of deviation becomes zero.

The control loop or the restraining system according to the present example is not a passive type, but an active type system, considering that the amount of deviation of the gyro rotor 20 is measured in actual practice, and electrostatic forces are actively changed so that the above deviation becomes zero.

Referring to FIG. 3, the operation of the restraining control system will be described in detail. The gyro rotor 20 is rotating at a high speed in actual practice, and four parts at positions corresponding to the first, second, third, and fourth pairs of the electrostatic supporting electrodes in the gyro rotor 20 are assumed to be $P_1$, $P_2$, $P_3$, and $P_4$, respectively.

FIG. 3 is a cross sectional view of the gyro apparatus according to the present example, taken along the XZ plane, in which the first and third pairs of electrostatic supporting electrodes 221, 231; and 223, 233, disposed along the X axis, and the first and third parts $P_1$, $P_3$ of the gyro rotor 20 corresponding to the above electrodes, are shown. Although the second and fourth pairs of electrostatic supporting electrodes disposed along the Y axis, and the second and fourth parts $P_2$, $P_4$ of the gyro rotor 20 corresponding to the above electrodes, are not shown in the figure, they are disposed along the direction perpendicular to the sheet of drawing.

The circumference portions 221A, 221B, 221C, 221D of the electrostatic supporting electrode 221 in the first pair are corresponding to the electrode portions 200A, 200B, 200C, 200D on the upper surface of the gyro rotor 20; the circumference portions 231A, 231B, 231C, 231D of the electrostatic supporting electrode 231 in the first pair are corresponding to the electrode portions 200A', 200B', 200C', 200D' on the lower surface of the gyro rotor 20; the circumference portions 223A, 223B, 223C, 223D of the electrostatic supporting electrode 223 in the third pair are corresponding to the electrode portions 200A, 200B, 200C, 200D on the upper surface of the gyro rotor 20; the circumference portions 233A, 233B, 233C, 233D of the electrostatic supporting electrode 233 in the third pair are corresponding to the electrode portions 200A', 200B', 200C', 200D' on the lower surface of the gyro rotor 20; The second pair of the electrostatic supporting electrodes, and those for the fourth pair will be the same as described above.

A manner in which the control direct-current voltages are applied to the electrostatic supporting electrodes will be described. The circumference portions 221A, 221C of the first comb-shaped portion 221-1 of the first pair of the electrostatic supporting electrode 221 are connected to a direct-current voltage $-V_{1A}$ through an adder 36-1A; the circumference portions 221B, 221D of the second comb-shaped portion 221-2 are connected to a direct-current voltage $+V_{1A}$ through an adder 36+1A; the circumference portions 231A, 231C of the first comb-shaped portion 231-1 of the first pair of the electrostatic supporting electrode 231 are connected to a direct-current voltage $-V_{1B}$ through an adder 36-1B; and the circumference portions 231B, 231D of the second comb-shaped portion 231-2 are connected to a direct-current voltage $+V_{1B}$ through an adder 36+1B.

Similarly, the circumference portions 223A, 223C of the first comb-shaped portion 223-1 of the third pair of the electrostatic supporting electrode 223 are connected to a direct-current voltage $-V_{3A}$ through an adder 36-3A; the circumference portions 223B, 223D of the second comb-shaped portion 223-2 are connected to a direct-current voltage $+V_{3A}$ through an adder 36+3A; the circumference portions 233A, 233C of the first comb-shaped portion 233-1 of the third pair of the electrostatic supporting electrode 233 are connected to a direct-current voltage $-V_{3B}$ through an adder 36-3B; and the circumference portions 233B, 233D of the second comb-shaped portion 233-2 are connected to a direct-current voltage $+V_{3B}$ through an adder 36+3B.

Although not shown in the figure, the circumference portions 222A, 222C of the first comb-shaped portion 222-1 of the second pair of the electrostatic supporting electrode 222 are connected to a direct-current voltage $-V_{2A}$; the circumference portions 222B, 222D of the second comb-shaped portion 222-2 are connected to a direct-current voltage $+V_{2A}$; the circumference portions 232A, 232C of the first comb-shaped portion 232-1 of the second pair of the electrostatic supporting electrode 232 are connected to a direct-current voltage $-V_{2B}$; and the circumference portions 232B, 232D of the second comb-shaped portion 232-2 are connected to a direct-current voltage $+V_{2B}$.

Similarly, the circumference portions 224A, 224C of the first comb-shaped portion 224-1 of the fourth pair of the electrostatic supporting electrode 224 are connected to a direct-current voltage $-V_{4A}$; the circumference portions 224B, 224D of the second comb-shaped portion 224-2 are connected to a direct-current voltage $+V_{4A}$; the circumference portions 234A, 234C of the first comb-shaped portion 234-1 of the fourth pair of the electrostatic supporting electrode 234 are connected to a direct-current voltage $-V_{4B}$; and the circumference portions 234B, 234D of the second comb-shaped portion 234-2 are connected to a direct-current voltage $+V_{4B}$.

Then, A manner in which the detection alternating-current voltages are applied to the electrostatic supporting electrodes will be described. The detection alternating-current voltages, $AC_{1A}$, $AC_{1B}$, $AC_{3A}$, $AC_{3B}$, which have been superimposed on the control direct-current voltages, are applied to the first pair and the third pair of the electrostatic supporting electrodes 221, 231; and 223, 233. As shown in the figure, the detection alternating-current voltages $AC_{1A}$, $AC_{1B}$, are applied to the first pair of the adders 36-1A, 36+1A, and 36-1B, 36+1B, and the detection alternating-current voltages $AC_{3A}$, $AC_{3B}$ are applied to the third pair of the adders 36-3A, 36+3A, and 36-3B, 36+3B. Similarly, the detection alternating-current voltages $AC_{2A}$, $AC_{2B}$, and $AC_{4A}$, $AC_{4B}$ are applied to the second and the fourth pairs of the adders, respectively. The above described detection alternating-current voltages $AC_{1A}$, $AC_{1B}$, $AC_{3A}$, $AC_{3B}$, $AC_{2A}$, $AC_{2B}$, and $AC_{4A}$, $AC_{4B}$ are respectively expressed by the following equations:

[Numerical Expression 1]

$$AC_{1A} = -EX - E\theta - EZ$$

$$AC_{1B} = -EX + E\theta + EZ$$

$$AC_{3A} = +EX + E\theta + EZ$$

$$AC_{3B} = +EX - E\theta + EZ$$

[Numerical Expression 2]

$$AC_{2A} = -EY - E\phi - EZ$$

$$AC_{2B} = -EY + E\phi + EZ$$

$$AC_{4A} = +EY + E\phi - EZ$$

$$AC_{4B} = +EY - E\phi + EZ$$

where individual terms on the right side for the detection alternating-current voltages $AC_{1A}$, $AC_{1B}$, $AC_{3A}$, $AC_{3B}$; and $AC_{2A}$, $AC_{2B}$, $AC_{4A}$, $AC_{4B}$ are expressed as follows:

[Numerical Expression 3]

$$+EX = E_0 \cos(\omega_1 t + \zeta_1)$$

$$-EX = E_0 \cos(\omega_1 t + \eta_1)$$

$$+EY = E_0 \cos(\omega_2 t + \zeta_2)$$

$$-EY = E_0 \cos(\omega_2 t + \eta_2)$$

$$+EZ = E_0 \cos(\omega_3 t + \zeta_3)$$

$$-EZ = E_0 \cos(\omega_3 t + \eta_3)$$

$$+E\theta = E_0 \cos(\omega_4 t + \zeta_4)$$

$$-E\theta = E_0 \cos(\omega_4 t + \eta_4)$$

$$+E\phi = E_0 \cos(\omega_5 t + \zeta_5)$$

$$-E\phi = E_0 \cos(\omega_5 t + \eta_5)$$

where $\pm EX$ represent voltage components for detecting a linear displacement $\Delta X$ in the X-axis direction of the gyro rotor 20; $\pm EY$ represent voltage components for detecting a linear displacement ΔY in the Y-axis direction of the gyro rotor 20; ±EZ represent voltage components for detecting a linear displacement ΔZ in the Z-axis direction of the gyro rotor 20; ±Eθ represent voltage components for detecting a rotational displacement Δθ around the Y-axis of the gyro rotor 20; and ±Eφ represent voltage components for detecting a rotational displacement Δφ around the X-axis of the gyro rotor 20.

$\omega_1$, $\omega_2$, $\omega_3$, $\omega_4$, and $\omega_5$ are displacement detection frequencies. Further, the sign of ±EX, ±EY, ±EZ, ±Eθ, and ±Eφ shows the phase difference of 180 degrees. Therefore, the phase differences ζ, η have the relationship expressed as follows:

[Numerical Expression 4]

$$\eta_1 = \zeta_1 \pm 180°$$

$$\eta_2 = \zeta_2 \pm 180°$$

$$\eta_3 = \zeta_3 \pm 180°$$

$$\eta_4 = \zeta_4 \pm 180°$$

$$\eta_5 = \zeta_5 \pm 180°$$

Referring to FIG. 4, the principle of the displacement-detection system according to the present example will be described. FIG. 4 shows the equivalent circuit of the restraining control system and the rotor drive system. In the equivalent circuit of the restraining control system, capacitors are substituted for the first and the third pairs of electrostatic supporting electrodes 221, 231 and 223, 233, and the corresponding electrode portions 200A, 200A', 200C, 200C' of the gyro rotor 20. As described above, the capacitance between the first comb-shaped portions 221-1 and the first and third electrode portions 200A, 200C is equal to that between the second comb-shaped portions 221-2 and the second and fourth electrode portions 200B, 200D at the first electrostatic supporting electrode 221 in the first pair of the electrostatic supporting electrodes 221, 231, and the value of the capacitance is $C_{1A}$; and the capacitance between the first comb-shaped portions 231-1 and the first and third electrode portions 200A', 200C' is equal to that between the second comb-shaped portions 231-2 and the second and fourth electrode portions 200B', 200D' at the second electrostatic supporting electrode 231, and the value of the capacitance is $C_{1B}$.

Similarly, the capacitance between the first comb-shaped portions 223-1 and the first and third electrode portions 200A, 200C is equal to that between the second comb-shaped portions 223-2 and the second and fourth electrode portions 200B, 200D at the first electrostatic supporting electrode 223 of the third pair of electrostatic supporting electrodes 223, 233, and the value of the capacitances is $C_{3A}$, and capacitance between the first comb-shaped portions 233-1 and the first and third electrode portions 200A', 200C' is equal to that between the second comb-shaped portions 233-2 and the second and fourth electrode portions 200B', 200D' at the second electrostatic supporting electrode 233, and the value of the capacitances is $C_{3B}$.

A cross section, taken along the YZ plane, of the gyro apparatus according to the present example is not shown in the figure. However, a similar argument will be applied to the second and fourth pairs of electrostatic supporting electrodes 222, 232; and 224, 234, which are disposed along the Y axis, and the corresponding second and the fourth parts $P_2$, $P_4$ of the gyro rotor 20.

Capacitance of the capacitor, comprising the displacement-detection electrodes 226, 236, and the corresponding displacement-detection electrode portion 200F, 200F' of the gyro rotor 20 respectively, are assumed to be $C_{FA}$, and $C_{FB}$, respectively.

Assume that the gyro rotor 20 is linearly displaced in the X-axis direction by ΔX, linearly displaced in the Y-axis direction by ΔY, and linearly displaced in the Z-axis direction by ΔZ and that the gyro rotor 20 is rotationally displaced around the Y-axis by a rotating angle of Δθ, rotationally displaced around the X axis by a rotating angle of Δφ. When it is supposed that such displacements of the gyro rotor 20 are sufficiently small, the capacitance of individual capacitors is expressed by the following equation:

[Numerical Expression 5]

$$C_{1A} = C_0 (1 + \Delta X + \Delta Z + \Delta \theta)$$

$$C_{1B} = C_0 (1 + \Delta X - \Delta Z - \Delta \theta)$$

$$C_{2A} = C_0 (1 + \Delta Y + \Delta Z + \Delta \phi)$$

$$C_{2B} = C_0 (1 + \Delta Y - \Delta Z - \Delta \phi)$$

$$C_{3A} = C_0 (1 - \Delta X + \Delta Z - \Delta \theta)$$

$$C_{3B} = C_0 (1 - \Delta X - \Delta Z + \Delta \theta)$$

$$C_{4A} = C_0 (1 - \Delta Y + \Delta Z - \Delta \phi)$$

$$C_{4B} = C_0 (1 - \Delta Y - \Delta Z + \Delta \phi)$$

where $C_0$ represents the electrostatic capacity obtained when all the displacements of the gyro rotor 20 is zero. Conversely, individual displacements ΔX, ΔY, ΔZ, Δθ, and Δφ may be represented by the capacitance of the capacitors, using the above expression:

[Numerical Expression 6]

$$\Delta X = (1/4 C_0) (C_{1A} + C_{1B} - C_{3A} - C_{3B})$$

$$\Delta Y = (1/4 C_0) (C_{2A} + C_{2B} - C_{4A} - C_{4B})$$

$$\Delta Z = (1/4 C_0) (C_{1A} - C_{1B} + C_{3A} - C_{3B})$$

$$= (1/4 C_0) (C_{2A} - C_{2B} + C_{4A} - C_{4B})$$

$$\Delta \theta = (1/4 C_0) (C_{1A} - C_{1B} - C_{3A} + C_{3B})$$

$$\Delta \phi = (1/4 C_0) (C_{2A} - C_{2B} - C_{4A} + C_{4B})$$

The control direct current voltages $\pm V_{1A}$, $\pm V_{1B}$, $\pm V_{3A}$, and $\pm V_{3B}$ with the same magnitude but with the opposite polarities are applied to the two comb-shaped portions 221-1 and 221-2, 231-1 and 231-2, 223-1 and 223-2, 233-1 and 233-2 in the individual electrostatic supporting electrodes, whereby the potentials developed at the junctions $Q_1$, $Q_2$, $Q_3$, $Q_4$ (only $Q_1$, and $Q_3$ are shown in the figure) of the two pairs of capacitors become zero. Accordingly, since the control direct current voltages with the same magnitude but with the opposite polarities are applied to the comb-shaped portions of each pair of electrostatic supporting electrodes, the potential of the gyro rotor 20 becomes zero.

When the detection alternating-current voltages, $AC_{1A}$, $AC_{1B}$, $AC_{2A}$, $AC_{2B}$, $AC_{3A}$, $AC_{3B}$, and $AC_{4A}$, $AC_{4B}$, which have been superimposed on the control direct-current voltages, are individually applied to the first through the fourth pairs of the electro static supporting electrodes 221, 231, 222, 232, 223, 233, and 224, 234, the displacement-detection alternate-current $i_P$ is generated in the displacement-detection electrodes 226, 236. The above displacement-detection alternate-current $i_P$ is expressed by the following equation:

[Numerical Expression 7]

$$i_P = K'(C_{1A}AC_{1A} + C_{1B}AC_{1B} + C_{2A}AC_{2A} + C_{2B}AC_{2B} + C_{3A}AC_{3A} + C_{3B}AC_{3B} + C_{4A}AC_{4A} + C_{4B}AC_{4B})$$

$$K' = 2(C_{FA} + C_{FB})s/(2C_{1A} + 2C_{1B} + 2C_{2A} + 2C_{2B} + 2C_{3A} + 2C_{3B} + 2C_{4A} + 2C_{4B} + C_{FA} + C_{FB})$$

where K' is a proportional constant, and s is a Laplacian operator. When the detection alternating-current voltages $AC_{1A}$, $AC_{1B}$, $AC_{2A}$, $AC_{2B}$, $AC_{3A}$, $AC_{3B}$, and $AC_{4A}$, $AC_{4B}$ expressed by Numerical Expression 1, and Numerical Expression 2; and the capacitance $C_{1A}$, $C_{1B}$, $C_{2A}$, $C_{2B}$, $C_{3A}$, $C_{3B}$, and $C_{4A}$, $C_{4B}$ expressed by Numerical Expression 5 are substituted into the above expression, the displacement-detection alternate-current $i_P$ is represented by the displacements after proper disposition. Consequently, when the gyro rotor 20 is linearly displaced by $\Delta X$ in the X-axis direction, linearly displaced by $\Delta Y$ in the Y-axis direction, linearly displaced by $\Delta Z$ in the Z-axis direction, rotationally displaced by a rotating angle of $\Delta\theta$ around the Y-axis, and rotationally displaced by a rotating angle of $\Delta\phi$ around the X-axis, the displacement-detection alternating-current $i_P$ is expressed by the following equation:

[Numerical Expression 8]

$$i_P = K_I(EX\Delta X + EY\Delta Y + 2EZ\Delta Z + E\theta\Delta\theta + E\phi\Delta\phi)$$

$$K_I = -8sC_0(C_{FA} + C_{FB})/(16C_0 + C_{FA} + C_{FB})$$

where $K_I$ is a proportional constant, and s is a Laplacian operator. The above displacement-detection alternating-current $i_P$ is supplied to the preamplifier 35 through a resistor 36 with a resistance R, and converted into a displacement-detection alternating-current voltage $V_P$. Such displacement-detection alternating-current voltage $V_P$ is represented by the following equation:

[Numerical Expression 9]

$$V_P = V_P(X) + V_P(Y) + V_P(Z) + V_P(\theta) + V_P(\phi)$$

where individual terms in the right side are voltage components corresponding to individual displacements $\Delta X$, $\Delta Y$, $\Delta Z$, $\Delta\theta$, and $\phi$, and are expressed by the following equation:

[Numerical Expression 10]

$$V_P(X) = K_I E X \Delta X = K_{V1} E_0 \omega_1 \Delta X \sin(\omega_1 t + \zeta_1)$$

$$V_P(Y) = K_I E Y \Delta Y = K_{V2} E_0 \omega_2 \Delta Y \sin(\omega_2 t + \zeta_2)$$

$$V_P(Z) = K_I E Z \Delta Z = K_{V3} E_0 \omega_3 \Delta Z \sin(\omega_3 t + \zeta_3)$$

$$V_P(\theta) = K_I E \theta \Delta\theta = K_{V4} E_0 \omega_4 \Delta\theta \sin(\omega_4 t + \zeta_4)$$

$$V_P(\phi) = K_I E \phi \Delta\phi = K_{V5} E_0 \omega_5 \Delta\phi \sin(\omega_5 t + \zeta_5)$$

where $K_{V1}$ through $K_{V5}$ are constants defined by the capacitance $C_0$, $C_{FA}$, and $C_{FB}$ of the capacitor. As is evident from Numerical Expressions 9 and 10, the output voltage $V_P$ independently includes all the displacements of the gyro rotor 20. Therefore, when a desired voltage component is calculated based on Numerical Expression 9, a displacement corresponding to the above component is obtained. For example, even when two or more of linear displacements $\Delta X$, $\Delta Y$, $\Delta Z$, and rotational displacements $\Delta\theta$, $\Delta\phi$ are superimposed, each displacement is obtained by calculating a voltage component corresponding to the displacement. Further, the above equation shows that the output voltage $V_P$ is amplitude-modulated according to individual displacement-detection frequencies $\omega_1-\omega_5$ corresponding to linear displacements $\Delta X$, $\Delta Y$, $\Delta Z$, and rotational displacements $\Delta\theta$, $\Delta\phi$.

When linear displacements $\Delta X$, $\Delta Y$, $\Delta Z$, and rotational displacements $\Delta\theta$, $\Delta\phi$ are obtained, control direct-current voltages are calculated based on the displacement. The control direct-current voltages are expressed by the following equation:

[Numerical Expression 11]

$$V_{1A} = V_0 + \Delta V_{1A}$$

$$V_{1B} = V_0 + \Delta V_{1B}$$

$$V_{2A} = V_0 + \Delta V_{2A}$$

$$V_{2B} = V_0 + \Delta V_{2B}$$

$$V_{3A} = V_0 + \Delta V_{3A}$$

$$V_{3B} = V_0 + \Delta V_{3B}$$

$$V_{4A} = V_0 + \Delta V_{4A}$$

$$V_{4B} = V_0 + \Delta V_{4B}$$

$V_{1A}$ and $V_{1B}$ are control direct-current voltages applied to the first pair of electrostatic supporting electrodes 221, 231; $V_{2A}$ and $V_{2B}$ are control direct-current voltages applied to the second pair of electrostatic supporting electrodes 222, 232; $V_{3A}$ and $V_{3B}$ are control direct-current voltages applied to the third pair of electrostatic supporting electrodes 223, 233; and $V_{4A}$ and $V_{4B}$ are control direct-current voltages applied to the fourth pair of electrostatic supporting electrodes 224, 234.

$V_0$ is a known reference voltage. Therefore, in order to obtain the control direct-current voltages, it is only required to obtain changed amounts of the above voltages $\Delta V_{1A}$, $\Delta V_{1B}$, $\Delta V_{2A}$, $\Delta V_{2B}$, $\Delta V_{3A}$, $\Delta V_{3B}$, and $\Delta V_{4A}$, $\Delta V_{4B}$. The above changed amounts may be obtained by calculation based on linear displacements $\Delta X$, $\Delta Y$, $\Delta Z$, and rotational displacements $\Delta\theta$, $\Delta\phi$. In the first place, forces Fx, Fy, Fz made to be dimensionless, and torques T$\theta$, T$\phi$ are calculated from linear displacements $\Delta X$, $\Delta Y$, $\Delta Z$, and rotational displacements $\Delta\theta$, $\Delta\phi$. Description of the dimensionless calculation in detail will be omitted. Refer to the above application for the detailed description.

In the calculation for obtaining the changed amounts of the control direct current voltages based on the dimensionless forces Fx, Fy, Fz, and torques T$\theta$, T$\phi$, the required conditional expressions, considering that of variables (changed amount), are not sufficient. Accordingly, further conditional expression is provided for changed amounts $\Delta V_{1A}$, $\Delta V_{1B}$, and, $\Delta V_{3A}$, $\Delta V_{3B}$; $\Delta V_{2A}$, $\Delta V_{2B}$, and, $\Delta V_{4A}$, $\Delta V_{4B}$.

[Numerical Expression 12]

$$\Delta V_{1A} + \Delta V_{1B} + \Delta V_{3A} + \Delta V_{3B} = 0$$

$$\Delta V_{2A} + \Delta V_{2B} + \Delta V_{4A} + \Delta V_{4B} = 0$$

The changed amounts of the control direct-current voltages $\Delta V_{1A}$ through $\Delta V_{4B}$ are calculated based on the above conditional expression. The above calculation is expressed as follows:

[Numerical Expression 13]

$$\Delta V_{1A} = (V_0/4)(Fx + Fz/2 + T\theta)$$

$$\Delta V_{1B} = (V_0/4)(Fx - Fz/2 - T\theta)$$

$$\Delta V_{2A} = (V_0/4)(Fy + FZ/2 + T\phi)$$

$$\Delta V_{2B} = (V_0/4)(Fy - FZ/2 - T\phi)$$

$$\Delta V_{3A} = (V_0/4)(-Fx + Fz/2 - T\theta)$$

$$\Delta V_{3B} = (V_0/4)\ (-Fx-Fz/2+T\theta)$$

$$\Delta V_{4A} = (V_0/4)\ (-Fy+Fz/2-T\phi)$$

$$\Delta V_{4B} = (V_0/4)\ (-Fy-Fz/2+T\phi)$$

The dimensionless forces Fx, Fy, Fz, and torques T$\theta$, T$\phi$ are supplied to the gyro-acceleration-output calculation unit 145, in which external accelerations $\alpha_x$, $\alpha_y$, $\alpha_z$, and angular velocities d$\theta$/dt, d$\phi$/dt are calculated. The external accelerations and the angular velocities are expressed as follows:
[Numerical expression 14]

$$\alpha_X = Fx/mg$$

$$\alpha_Y = Fy/mg$$

$$\alpha_Z = Fz/mg$$

$$d\theta/dt = T\theta/H$$

$$d\phi/dt = T\phi/H$$

where m represents the mass of the gyro rotor 20; g represents the gravitational acceleration; and H represents a spin angular momentum of the gyro rotor 20.

Next, the rotor drive system in the gyro apparatus will be described. As shown in FIGS. 2 through 4, the rotor drive system according to the present example includes: driving electrode portions 200E and 200E' formed on the upper surface and the lower surface of the gyro rotor 20; driving electrodes 225, 235 formed on the upper bottom member 22 and the lower bottom member 24 of the gyro case 21; and the rotor driving unit 160. The rotor drive system according to the present example is configured such that instruction signals from the sequence control unit 170 are input to the system, and the driving voltages are supplied to the driving electrodes 225, 235 to start, rotate, and stop the gyro rotor 20.

Further, as described above, the driving electrode portion 200E of the gyro rotor 20 and the driving electrode 225; the driving electrode portion 200E' and the driving electrode 235 are respectively disposed in a row on the circumference with the same radius, and each of them comprises a plurality of sectorial portions in the same shape, as shown in FIG. 1B.

The driving electrode portions 200E and 200E', and the driving electrodes 225, 235 constitute three-phase electrode. According to the present example, the upper driving electrode portion 200E of the gyro rotor 20 includes four sectorial portions which are spaced apart from each other by a central angle of ninety degrees, and the lower driving electrode portion 200E' of the gyro rotor 20 includes four sectorial portions which are spaced apart from each other by a central angle of ninety degrees.

Corresponding to the above described electrode portions, the upper driving electrode 225 of the gyro case 21 includes twelve sectorial portions spaced apart from each other by the same central angle; and the lower driving electrode 235 of the gyro case 21 includes twelve sectorial portions spaced apart from each other by the same central angle. Each of twelve driving electrodes 225 or 235 comprises four sets of sectorial portions, respectively, and individual sectorial portions include three sectorial portions, that is, the first-phase, the second-phase, and the third-phase sectorial portions.

The corresponding phases of the sectorial portions of each set of the driving electrode 225 or 235 are electrically connected to each other. For example, the four first-phase driving electrodes 225 or 235 are connected to each other; the four second-phase driving electrodes 225 or 235 are connected to each other; and the four third-phase driving electrodes 225 or 235 are connected to each other.

The three-phase driving voltage is supplied to the above three-phase common terminal. The driving voltage may be a step-like voltage or a pulse voltage. The above voltage is sequentially switched to the adjacent four sectorial portions of the subsequent phase. The switching of the driving voltage is performed synchronized with the rotation of the gyro rotor 20, whereby the gyro rotor 20 is rotated at a high speed. Since the cavity 26 of the gyro case 21 is maintained to be a high vacuum, the driving voltage may be either cut off or continuously supplied, once the gyro rotor 20 rotates at a high speed.

The driving electrode portions 200E, 200E', and the driving electrodes 225, 235, constituting the three-phase electrode, may be configured to include more sectorial portions. For example, the driving electrode portions 200E, 200E' may respectively include five sectorial portions, and concurrently the individual driving electrodes 225, 235 are configured to include five sets (fifteen pieces), corresponding to the above.

An equivalent circuit of the rotor drive system is shown at the right side of FIG. 4. Capacitors are substituted for the driving electrode portion 200E of the gyro rotor 20, and the driving electrode 225 of the gyro case 21; and capacitors are substituted for the driving electrode portion 200E' of the gyro rotor 20, and the driving electrode 235 of the gyro case 21. The driving direct-current voltages VR1, VR2, VR3 for rotating the gyro rotor 20, and the detection alternating-current voltages ACR1, ACR2, ACR3 for detecting the rotational angles of the gyro rotor 20 are applied to each capacitor.

Referring to FIG. 5, the operation of a driving motor according to the present example will be described in detail. FIG. 5 shows the state where the upper driving electrode portion 200E of the gyro rotor 20, which are circumferentially disposed in actual practice, and the upper driving electrode 225 of the gyro case 21, which is corresponding to the above electrode portions, are linearly disposed.

The upper driving electrode portion 200E of the gyro rotor 20 includes four sectorial portions 200E-1, 200E-2, 200E-3, 200E-4, which are spaced apart from each other by a central angle of ninety degrees. Corresponding to this, the upper driving electrode 225 of the gyro case 21 includes twelve sectorial portions; each sectorial portion comprises four sets; and individual sets include three, that is, three phase sectorial portions. The first-phase, the second-phase, and the third-phase sectorial portions of each set are denoted by reference numerals 225-1, 225-2, and 225-3, respectively.

The four first-phase sectorial portions 225-1 are electrically connected to each other; the four second-phase sectorial portions 225-2 are electrically connected to each other; and the four third-phase sectorial portions 225-3 are electrically connected to each other.

When the instruction signal from the sequence control unit 170 is supplied to the rotor driving unit 160, the driving direct-current voltages VR1, VR2, VR3, and the detection alternating-current voltages ACR1, ACR2, ACR3 are applied to individual three-phase driving electrodes 225-1, 225-2, 225-3.

The driving direct-current voltages VR1, VR2, VR3 are sequentially applied to the first-phase, second-phase, and third-phase electrodes 225-1, 225-2, 225-3 at every predetermined switching time $\Delta t$, whereby the gyro rotor 20 rotates around the central axis, that is, around the spin axis by 360/12 degrees=30 degrees at every switching time $\Delta t$.

Waveforms shown in the lower part of FIG. 5 represents rotational-angle detection currents generated in the displacement-detection electrodes 226, 236, or, rotational-angle detection voltages ACQ1, ACQ2, ACQ3 corresponding to the above currents. The rotational angle of the gyro rotor 20 is detected by such rotational-angle detection signals ACQ1, ACQ2, ACQ3.

For example, when the driving direct-current voltage VR1 is applied to the first-phase driving electrode 225-1, the gyro rotor 20 rotates around the central axis, until the four driving electrode portions 200E-1, 200E-2, 200E-3, 200E-4 are matched with the first-phase driving electrodes 225-1, 225-1, 225-1, 225-1, that is, by thirty degrees. Then, when the driving direct-current voltage VR2 is applied to the second-phase driving electrode 225-2, the gyro rotor 20 rotates around the central axis until the four driving electrode portions 200E-1, 200E-2, 200E-3, 200E-4 are matched with the second-phase driving electrodes 225-2, 225-2, 225-2, 225-2, that is, by thirty degrees.

In the restraining control system of the gyro apparatus, restraining forces or restoring forces are generated to return the gyro rotor to the reference position when the gyro rotor is deviated from the reference position. The restraining forces are electrostatic supporting forces of the capacitor comprising the electrode portions of the gyro rotor and the electrostatic supporting electrodes of the gyro case. For example, the restraining forces in the X-axis, Y-axis, and Z-axis directions are expressed by the following equation:
[Numerical Expression 15]

$$fx = (CV^2)/(2L)$$
$$fy = (CV^2)/(2L)$$
$$fz = (CV^2)/(2\zeta)$$

where C represents a capacitance of a capacitor; V represents a voltage; L represents a dimension of a side of a capacitor; and $\zeta$ represents a space between capacitors. Rotational moment $f\theta$ around the Y axis and rotational moment $f\phi$ around the X axis are obtained by multiplying the restraining force fz in the Z-axis direction by the arm r of the moment.

The electrostatic supporting voltage V for generating the restraining force is a sum of the reference voltage $V_0$ and the changed amount $\Delta V$ as shown by Numerical Expression 11, and the above changed amount is smaller than the reference voltage $V_0$. Therefore, when the voltage V is assumed to be equal in each equation of Numerical Expression 15, the restraining force is represented as a function of the dimension L and the space $\zeta$ of the capacitor. When it is assumed that the dimension of one side of the capacitor is about 30 micrometers and the space of the capacitor is about 5 micrometers, the restraining forces in the X-axis and Y-axis directions are about six times smaller than that of the Z-axis direction.

Therefore, there have been a disadvantage that the accuracy and sensitivity of the restraining control in the X-axis and Y-axis directions are lower than those of the restraining control in the Z-axis direction and around the X axis and Y axis.

Further, for example, when the acceleration of equal magnitude are applied in the X-axis and Y-axis, Z-axis directions, the restraining forces fx, fy in the X-axis and Y-axis directions; the rotational moment $f\theta$ around the Y-axis; and the rotational moment $f\phi$ around the X-axis increase. Accordingly, the changed amounts $\Delta V_{1A}$ through $\Delta V_{4B}$ of the control direct-current voltages expressed by Numerical Expression 13 become large, and this requires a high voltage to be generated.

Accordingly, the object of the present invention is to perform the restraining control in the X-axis and Y-axis directions with the same level of accuracy and sensitivity as those of the restraining control in the Z-axis direction and around the X-axis and Y-axis.

DISCLOSURE OF INVENTION

According to the present invention, an acceleration-detecting type gyro apparatus comprises:

a gyro case having a Z axis along the direction of a central axis, and X and Y axes perpendicular to the Z axis;

a gyro rotor which is supported within the gyro case by electrostatic supporting force such that the gyro rotor is not in contact with the gyro case, and has a spin axis in the central axis direction;

a plurality of electrostatic supporting electrodes which are spaced apart from the gyro rotor, and to which control voltages are applied;

a rotor drive system for rotating the gyro rotor around the spin axis at high speed;

a displacement-detection system for detecting linear displacements in the X-axis, Y-axis, and Z-axis directions, and rotational displacements around the Y and X axes of the gyro rotor; and a restraining control system having a feedback loop for correcting the control voltages so that displacements detected by the displacement-detection system become zero, in which the gyro rotor is annular-shaped, and the electrostatic supporting electrodes are disposed in the manner of surrounding the gyro rotor.

Accordingly, the magnitude of the restraining forces in the X-axis and Y-axis directions are on the same level as that of the restraining force in the Z-axis direction and torques around the X axis and Y axis, whereby the restraining control in the X-axis and Y-axis directions may be performed with the same levels of sensitivity and accuracy as those in the Z-axis direction and around the X-axis and Y-axis.

According to the present invention, the gyro rotor in the gyro apparatus is constituted to have a rectangular cross section formed of an upper surface, a lower surface, an inner circumference, and an outer circumference; the electrostatic supporting electrodes are provided in parallel to the upper surface, lower surface, inner circumference, and outer circumference. Therefore, sufficiently large electrostatic supporting forces may be generated by capacitors formed of the electrostatic supporting electrodes, the upper surface, lower surface, inner circumference, and outer circumference of the gyro rotor.

According to an embodiment of the present invention, the rotor drive system in the gyro apparatus comprises a plurality of rotor-driving electrodes which are provided corresponding to the upper and lower surfaces of the gyro rotor; a plurality of concave portions are provided on the upper and lower surfaces of the gyro rotor; and land portions between the concave portions are provided corresponding to the rotor-driving electrodes. According to another embodiment of the present invention, the rotor drive system in the gyro apparatus comprises a plurality of rotor-driving electrodes which are provided on the upper and lower surfaces of the gyro rotor; a plurality of through holes connecting the upper surface and the lower surface are provided in the gyro rotor; and land portions between the through holes are provided corresponding to the rotor-driving electrodes.

Accordingly, the rotor-driving forces in the circumferential direction may be efficiently generated.

According to the present invention, the displacement-detection system in the gyro apparatus comprises a plurality of displacement-detection electrodes which are spaced apart from the gyro rotor, in which the displacement-detection alternating-current voltages superimposed on the control voltages are applied to the electrostatic supporting electrodes and displacement-detection currents generated in the displacement-detection electrodes are detected by the displacement-detection alternating-current voltages, whereby the displacement of the gyro rotor is calculated.

According to the present invention, in the gyro apparatus, a plurality of the displacement-detection alternating-current voltages are constituted to be alternating-current voltages with different frequencies.

According to the present invention, in the gyro apparatus, a plurality of the displacement-detection alternating-current voltages are alternating-current voltages having the same frequency with different phases.

BRIEF DESCRIPTION OF DRAWINGS

FIG. 2 is a diagram showing an example of a control loop of the conventional gyro apparatus;

FIG. 6 is a diagram showing an embodiment of a gyro apparatus according to the present invention;

BEST MODES FOR CARRYING OUT THE INVENTION

Figure 1A:
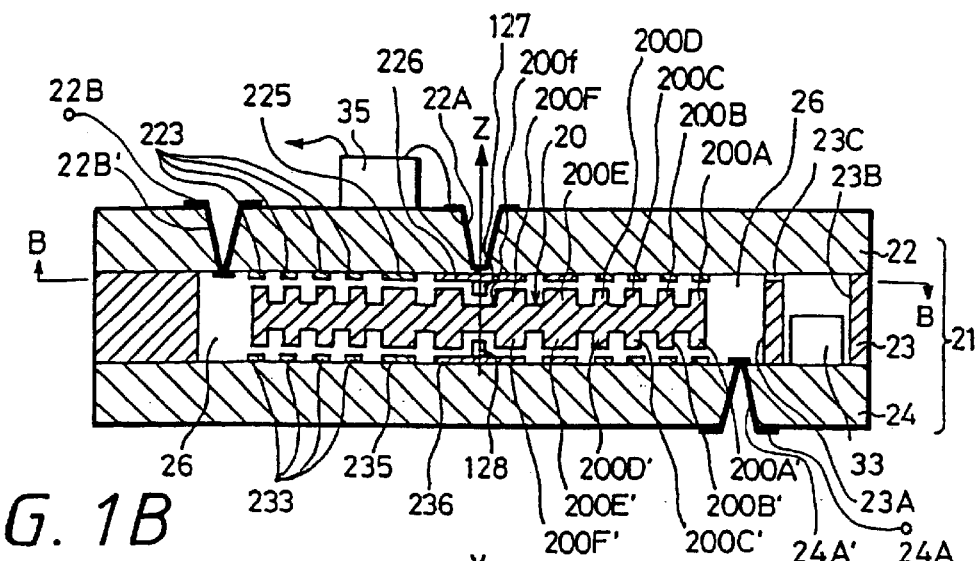
FIGS. 1A and 1B are diagrams showing an example of a conventional gyro apparatus.
Figure 1B:
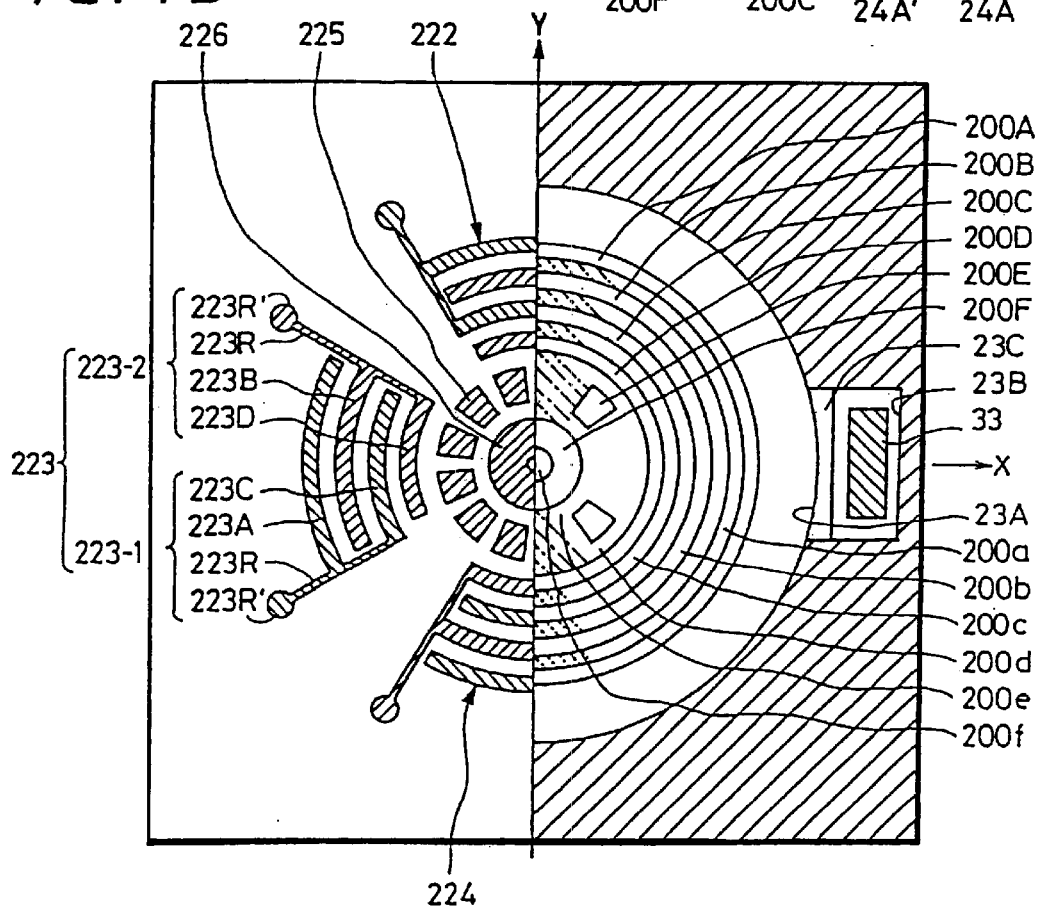
Figure 3:
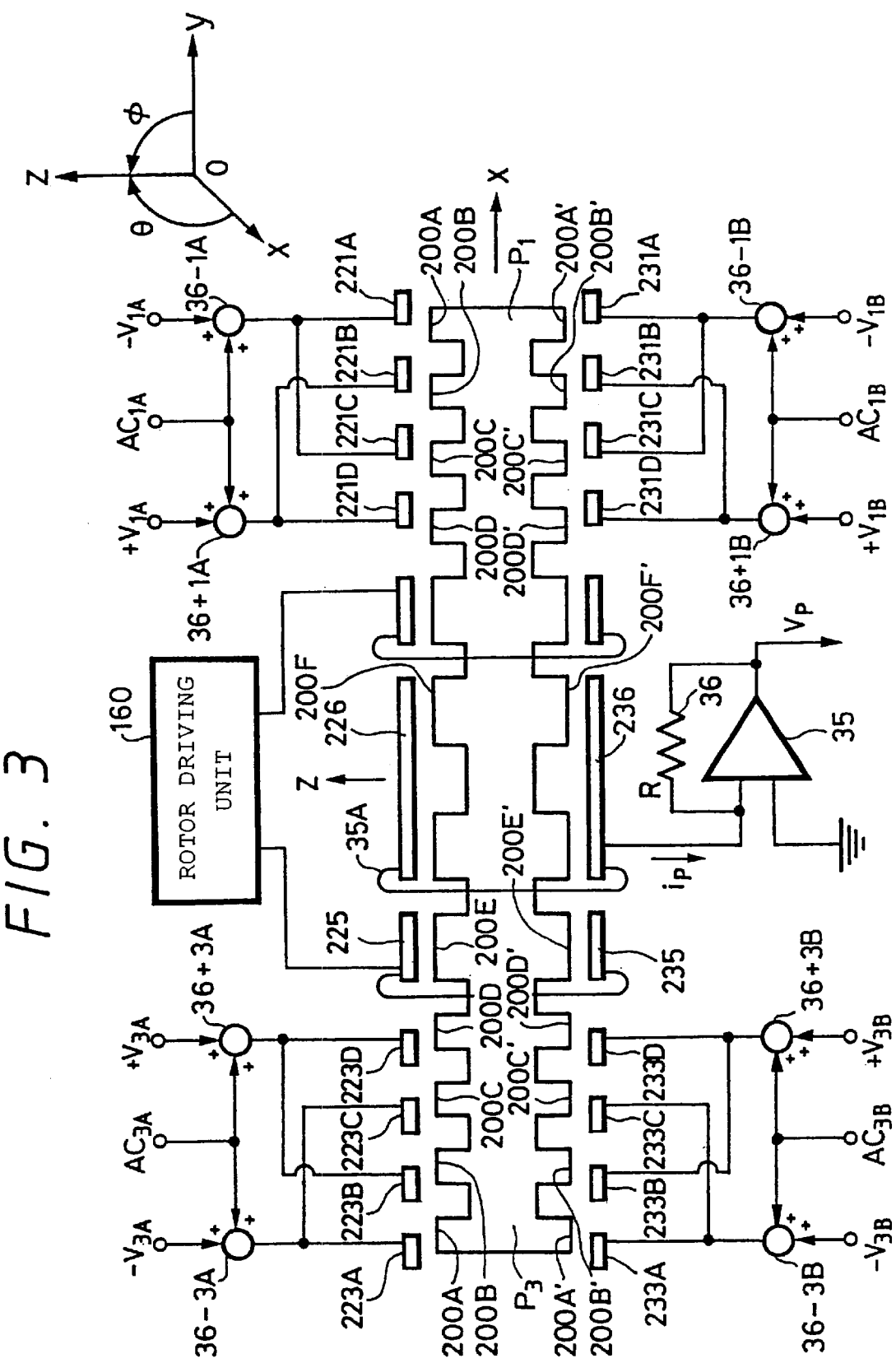
FIG. 3 is a diagram showing a restraining control system of the conventional gyro apparatus.
Figure 4:
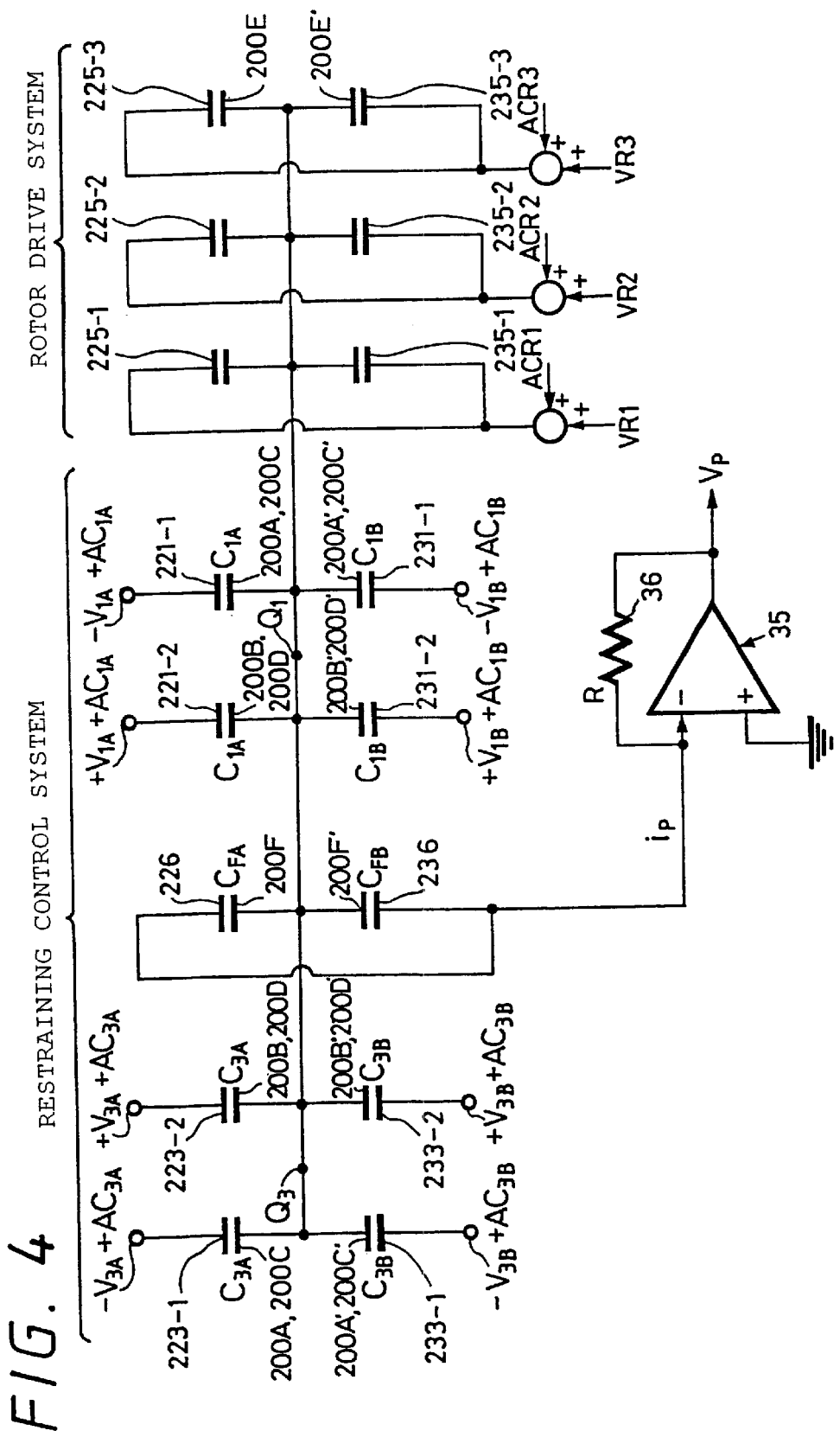
FIG. 4 is a diagram showing an equivalent circuit of the restraining control system and a rotor drive system of the conventional gyro apparatus.

Referring to FIG. 6, an embodiment of a gyro apparatus according to the present invention will be described. The gyro apparatus according to the present invention comprises an annular gyro rotor 20, and a gyro case 21 housing the rotor. The gyro case 21 comprises: an upper bottom member 22, a lower bottom member 24, and a spacer 23 connecting the upper and lower members, and the spacer 23 has an annular inner wall 23A. Thus, a closed disk-like cavity 26 is formed in the gyro case 21 with the inner surfaces of the upper bottom member 22 and the lower bottom member 24, and the inner wall 23A of the spacer 23. The above cavity 26 may be evacuated by a suitable method.

The annular gyro rotor 20 is housed within the gyro case 21. The gyro rotor 20 may have a rectangular cross section. Specifically, the gyro rotor 20 comprises a flat upper surface 20A and a flat lower surface 20B, both of which are parallel to each other, and an inner circumference 20C and a outer circumference 20D, both of which are parallel to each other.

XYZ coordinates are set for the gyro apparatus as shown in the figure. A Z axis is set upward along the central axis of the gyro apparatus, and an X axis and a Y axis are set perpendicularly to the Z axis. In a normal state, the spin axis of the gyro rotor 20 is disposed along the Z axis.

Electrodes are disposed in a manner as surrounding the gyro rotor 20. Twelve curved wall-like electrodes are disposed parallel to the inner circumference 20C and the outer circumference 20D of the gyro rotor 20 and along the circumferential direction thereof, respectively. The twelve wall-like electrodes on the inner-circumference side will be described. These wall-like electrodes include: X-axis electrostatic supporting electrodes 331, 333 disposed along the X-axis direction; Y-axis electrostatic supporting electrodes 332, 334 disposed along the Y-axis direction; and displacement-detection electrodes 336, 336, 336, 336, disposed therebetween.

Individual wall-like X-axis electrostatic supporting electrodes 331, 333, and Y-axis electrostatic supporting electrodes 332, 334 comprise a pair of electrodes as shown in the figure. The twelve wall-like electrodes 341, 342, 343, 344, and 346 on the outer-circumference side have a similar structure to that of the wall-like electrodes on the inner circumference side.

The upper end faces of these electrostatic supporting electrodes 331 through 334, 341 through 344, and displacement-detection electrodes 326, 336 are connected to the inner surface of the upper bottom member 22 of the gyro case 21, and the lower end faces of these electrostatic supporting electrodes and displacement-detection electrodes are connected to the inner surface of the lower bottom member 24 of the gyro case 21.

The upper and lower electrodes are disposed on the inner surface of the upper bottom member 22 and the lower bottom member 24 of the gyro case 21, corresponding to the gyro rotor 20. These upper and lower electrodes are disposed in parallel to the upper surface 20A and the lower one 20B of the gyro rotor 20 along the circumferential direction.

The upper electrodes include twelve rotor driving electrodes 315 on the inner-circumference side, and twelve electrodes on the outer-circumference side. Twelve electrodes on the outer-circumference side comprise X-axis electrostatic supporting electrodes 311, 313 disposed along the X-axis direction, Y-axis electrostatic supporting electrodes 312, 314 disposed along the Y-axis direction, and displacement-detection electrodes 316, 316, 316, 316, disposed therebetween.

The lower electrodes include twelve rotor driving electrodes 325 on the inner-circumference side, and twelve electrodes on the outer-circumference side. Twelve electrodes on the outer-circumference side includes X-axis electrostatic supporting electrodes 321, 323 disposed along the X-axis direction, Y-axis electrostatic supporting electrodes 322, 324 disposed along the Y-axis direction, and displacement-detection electrodes 326, 326, 326, 326, disposed therebetween.

As shown in FIG. 6, the inner diameters (distance from the center to the inner edge) of the rotor driving electrodes 315, 325 are preferably larger than that (distance from the center to the inner circumference 20C) of the gyro rotor 20.

Each of X-axis electrostatic supporting electrodes 311, 313, 321, 323 and Y-axis electrostatic supporting electrodes 312, 314, 322, 324 includes a pair of electrodes as shown in the figure.

The wall-like X-axis electrostatic supporting electrodes 331, 333, 341, 343 and the Y-axis electrostatic supporting electrodes 332, 334, 342, 344, which are disposed, facing to the inner circumference 20C and the outer circumference 20D of the gyro rotor 20; and the upper and lower X-axis electrostatic supporting electrodes 311, 313, 321, 323 and the Y-axis electrostatic supporting electrodes 312, 314, 322, 324, which are disposed on the upper surface 20A and the lower surface 20B of the gyro rotor 20, are respectively disposed at positions of the same angles on the circumference.

Similarly, the wall-like displacement-detection electrodes 336, 346, which are disposed, facing to the inner circumference 20C and the outer circumference 20D of the gyro rotor 20, and the upper and lower displacement-detection electrodes 316, 326, which are disposed, facing to the upper surface 20A and the lower surface 20B of the gyro rotor 20, are respectively disposed at positions of the same angles on the circumference.

With regard to the gyro rotor 20, the outer diameter D may be 5 mm or less, the thickness t may be 0.3 mm or less, and the mass may be 10 milligrams or less, respectively.

The gyro rotor 20 is formed with a conductive material. For example, single crystal silicon (silicon) may be used as such conductive material. By using the single crystal material, a gyro rotor with less thermal deformation, with smaller influence by secular change, and with higher accuracy may be provided.

The wall-liked electrodes, and the spacer 23, both of which are disposed, facing to the inner circumference 20C and the outer circumference 20D of the gyro rotor 20, may be formed with the same material as that of the gyro rotor 20.

The upper bottom member 22 and the lower bottom member 24 of the gyro case 21 are formed with a non-conductive material, for example, with glass. The upper and lower electrodes, both of which are formed on the inner surface of the upper bottom member 22 and the lower bottom member 24 of the gyro case 21, may be formed with a conductive material, for example, with a thin metal film.

A cylindrical housing chamber 330 is provided in the center portion of the gyro case. Circuit boards, and the like, are disposed in the housing chamber 330. Further, a getter may be disposed in this housing chamber 330, thereby maintaining the inside of the gyro case at a high degree of vacuum for a long period of time.

Electrodes surrounding the gyro rotor 20, that is, the wall-like electrodes 331, 332, 333, 334, 341, 342, 343, 344, the upper electrostatic supporting electrodes and the displacement-detection electrodes 311, 312, 313, 314, 316, lower electrostatic supporting electrodes and the displacement-detection electrodes 321, 322, 323, 324, 326, and the upper and lower driving electrodes 315, 325 may be connected by through hole connection to the circuit boards, and the like, provided in the housing chamber 330. The circuit board, and the like, in the housing chamber 330 may be electrically connected by through hole connection to external equipment.

The through hole connection will be described. Small holes, that is, through holes are provided in the upper bottom member 22 or the lower bottom member 24, though they are not shown in the figure. The through holes are provided at positions adjacent to the electrostatic supporting electrodes, displacement-detection electrodes, and driving electrodes. Metal films are formed on the inner surface of the through holes, and the metal films are electrically connected to the electrodes which are adjacent to the individual holes. Similarly, through holes are formed at positions adjacent to the housing chamber 330, and metal films are formed on the inner surfaces. The metal films and the circuit board, and the like, in the housing chamber 330 are electrically connected. In addition, metal films of the individual through holes are electrically connected to each other, and, at the same time, the individual through holes are electrically connected to external equipment.

Assume that the gyro rotor 20 is at a reference position, that is, the gyro rotor 20 is rotating at a high speed in a state parallel to the XY plane; and the spin axis is on the Z axis.

The space $\zeta$ between the upper surface 20A of the gyro rotor 20, and the upper electrostatic supporting electrodes 311, 312, 313, 314 and the displacement-detection electrode 316 corresponding to the surface 20A is equal to that between the lower surface 20B of the gyro rotor 20, and the lower electrostatic supporting electrodes 321, 322, 323, 324 and the displacement-detection electrode 326 corresponding to the surface 20B.

Similarly, the space $\zeta r$ between the inner circumference 20C of the gyro rotor 20, and the wall-like electrostatic supporting electrodes 331, 332, 333, 334 on the inner-circumference side and the displacement-detection electrode 336 corresponding to the circumference 20C is equal to that between the outer circumference 20D of the gyro rotor 20, and the wall-like electrostatic supporting electrodes 341, 342, 343, 344 on the outer-circumference side and the displacement-detection electrode 346 corresponding to the circumference 20D. These space $\zeta$ and $\zeta r$ may be several micrometers, for example, from 1 to 5 micrometers.

A capacitor is formed with the upper surface 20A of the gyro rotor 20 and the upper electrostatic supporting electrodes 311, 312, 313, 314 which are corresponding to the surface 20A. Further, a capacitor is formed with the lower surface 20B of the gyro rotor 20 and the lower electrostatic supporting electrodes 321, 322, 323, 324 which are corresponding to the surface 20B. Further, a capacitor is formed with the inner circumference 20C of the gyro rotor 20 and the wall-like electrostatic supporting electrodes 331, 332, 333, 334 on the inner-circumference side, which are corresponding to the circumference 20C. Furthermore, a capacitor is formed with the outer circumference 20D of the gyro rotor 20, and the wall-like electrostatic supporting electrodes 341, 342, 343, 344 on the outer circumference side, which are corresponding to the circumference 20D, Therefore, applying electrostatic supporting voltages to these electrostatic supporting electrodes causes the capacitors to generate electrostatic supporting forces, and the gyro rotor 20 is supported in a floating state by such electrostatic supporting forces.

As described above, individual wall-like X-axis electrostatic supporting electrodes 331, 333 and Y-axis electrostatic supporting electrodes 332, 334 comprise a pair of electrodes. Individual upper and lower X-axis electrostatic supporting electrodes 311, 313, 321, 323 and Y-axis electrostatic supporting electrodes 312, 314, 322, 324 comprise a pair of electrodes. Electrostatic supporting voltages, which have different signs from each other and have a same magnitude, are applied to individual pairs of electrodes. Therefore, an electric potential of the gyro rotor 20 is maintained at zero.

Accordingly, since the electric potential of the gyro rotor 20 supported by the electrostatic supporting forces in a floating state, is always zero, the electrostatic supporting forces acting between the gyro rotor 20 and the electrostatic supporting electrodes of the gyro case 21 can be freely controlled to a desired value.

Figure 7A:
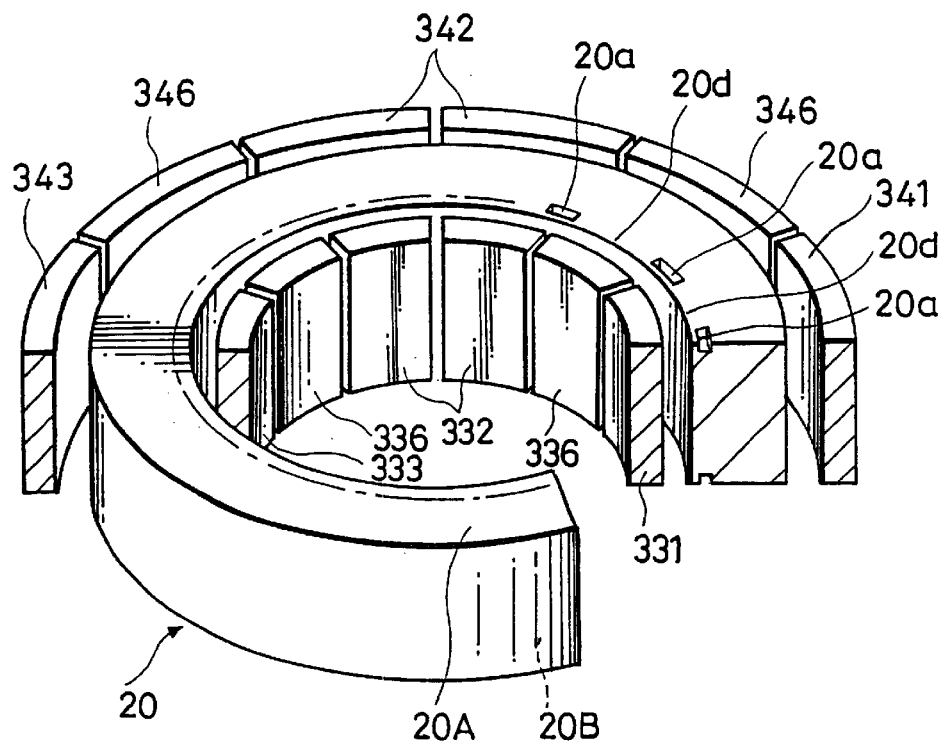
FIGS. 7A and 7B are diagrams showing another embodiment of a gyro rotor in the gyro apparatus according to the present invention.
Figure 7B:
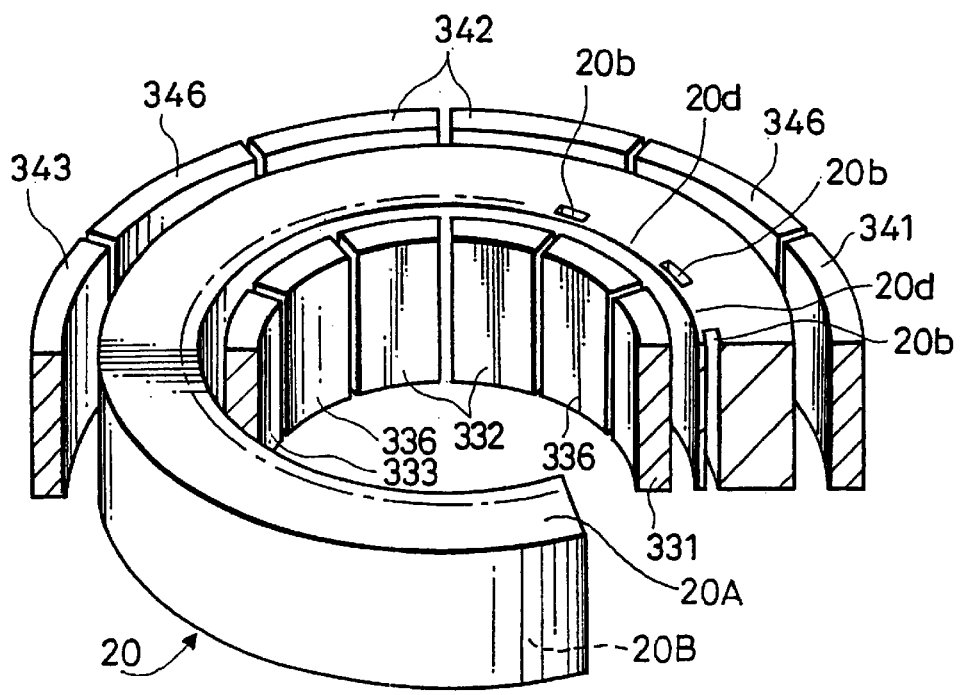

Referring to FIG. 7, examples of the electrode pattern of the gyro rotor 20 in the gyro apparatus according to the present invention will be described. In the example of FIG. 7A, twelve concave portions 20a are provided along the circumferential direction, and in the example of FIG. 7B, twelve through holes 20b are provided. Lands 20d are substantially formed between adjacent concave portions or through holes. The lands form the electrodes of the gyro rotor 20. Therefore, the lands are corresponding to the driving electrodes 315, 325. Specifically, the size of the twelve lands is corresponding to that of the individual driving electrodes 315, 325, respectively.

In the embodiment shown in FIG. 7, electrode portions comprising the lands are formed on the upper surface 20A and the lower surface 20B of the gyro rotor 20. Therefore, the electrostatic supporting forces in the circumferential direction are generated by the electrode portions on the upper surface 20A and the lower surface 20B of the gyro rotor 20 and the driving electrodes 315, 325, thereby the gyro rotor 20 being rotated.

Figure 8:
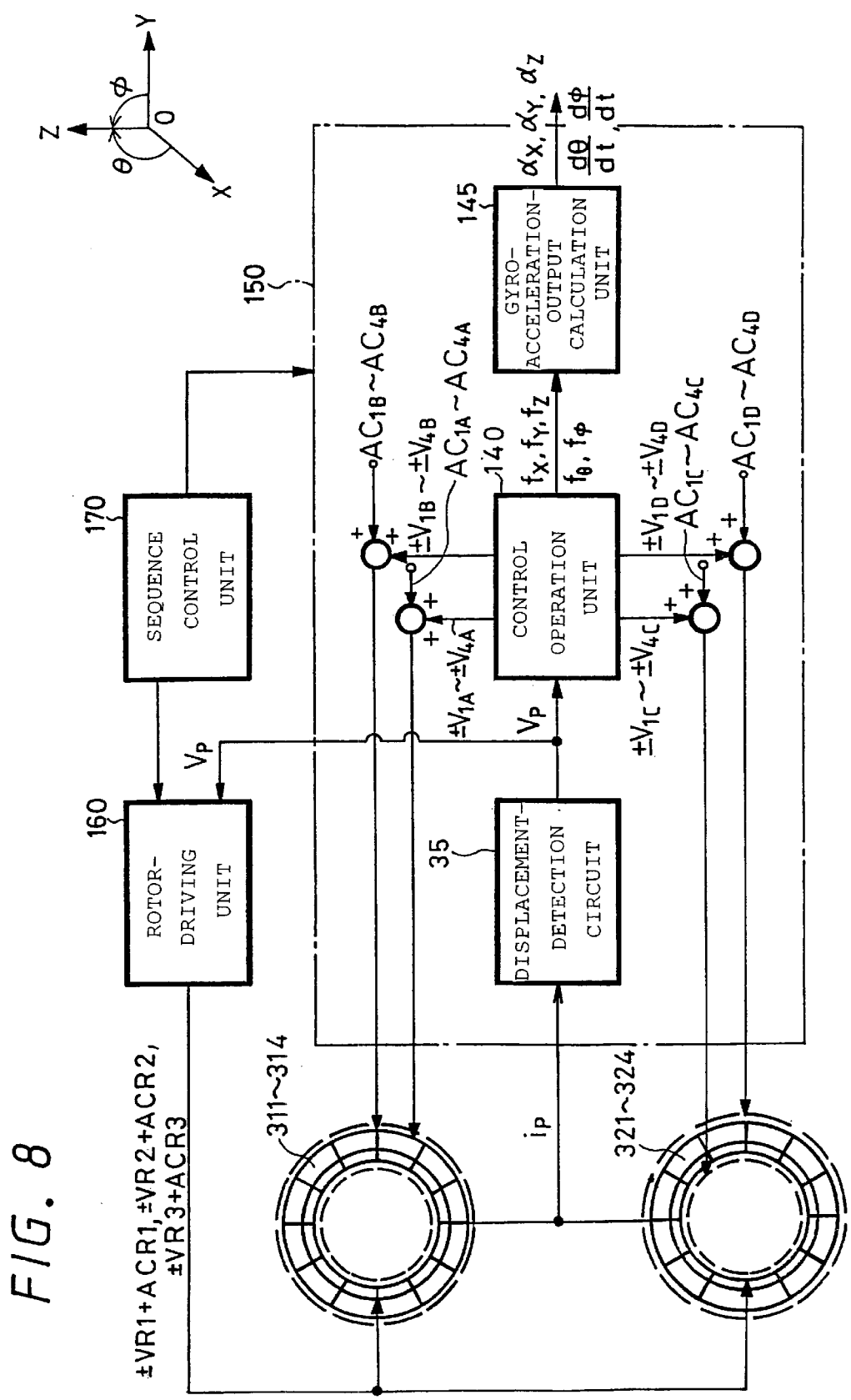
FIG. 8 is an explanatory diagram for describing a control loop of the gyro apparatus according to the present invention.

FIG. 8 shows an example of a control loop of a gyro apparatus according to the present invention. The control loop according to the present invention comprises a restraining control system including a restraining control unit 150, a rotor drive system including a rotor driving unit 160, and a sequence control unit 170. Note that individual units of the above control loop have basically the same functions as those of the individual units of a control loop in a conventional gyro apparatus which has been described referring to FIGS. 1 through 5, and the same reference numerals as those of the above units are denoted. Therefore, detailed description of the structures and the functions of the individual units will be omitted.

The restraining control unit 150 in the embodiment comprises: a displacement-detection circuit, that is, a preamplifier 35, by which a displacement-detection electric current $i_P$ is detected to convert the detected current into a displacement-detection voltage $V_P$; and a control operation unit 140 in which the above displacement-detection voltage $V_P$ is input, and control direct current voltages $\pm V_{1A}$ through $\pm V_{4A}$, $\pm V_{1B}$ through $\pm V_{4B}$, $\pm V_{1C}$ through $\pm V_{4C}$, and $\pm V_{1D}$ through $\pm V_{4D}$ are generated.

Further, the gyro apparatus according to the embodiment is provided with a gyro-acceleration-output calculation unit 145 in which an output signal of the control operation unit 140 is input, and an angular velocity, an acceleration and the like are calculated. However, the description of the configuration and the operation of the gyro-acceleration-output calculation unit 145 will be omitted.

Displacement-detection alternating-current voltages $AC_{1A}$ through $AC_{4A}$, $AC_{1B}$ through $AC_{4B}$, $AC_{1C}$ through $AC_{4C}$, $AC_{1D}$ through $AC_{4D}$ are respectively added to the control direct-current voltages $\pm V_{1A}$ through $\pm V_{4A}$, $\pm V_{1B}$ through $\pm V_{4B}$, $\pm V_{1C}$ through $\pm V_{4C}$, and $\pm V_{1D}$ through $\pm V_{4D}$, which have been output by the control operation unit 140, and the added voltages are supplied to the electrostatic supporting electrodes 311 through 314, 321 through 324, 331 through 334, 341 through 344. The displacement-detection alternating-current voltages $AC_{1A}$ through $AC_{4A}$, $AC_{1B}$ through $AC_{4B}$, $AC_{1C}$ through $AC_{4C}$, $AC_{1D}$ through $AC_{4D}$ are expressed by the following equation:

[Numerical Expression 16]

$AC_{1A} = -E\theta - EZ$ $AC_{1B} = +E\theta + EZ$ $AC_{2A} = -E\phi - EZ$ $AC_{2B} = +E\phi + EZ$ $AC_{3A} = +E\theta - EZ$ $AC_{3B} = -E\theta + EZ$ $AC_{4A} = +E\phi - EZ$ $AC_{4B} = -E\phi + EZ$

[Numerical Expression 17]

$AC_{1C} = +EX$ $AC_{1D} = -EX$ $AC_{2C} = +EY$ $AC_{2D} = -EY$ $AC_{3C} = +EX$ $AC_{3D} = -EX$ $AC_{4C} = +EY$ $AC_{4D} = -EY$

The individual terms on the right side for the above detection alternating-current voltages $AC_{1A}$, $AC_{1B}$, $AC_{2A}$, $AC_{2B}$, $AC_{3A}$, $AC_{3B}$, and $AC_{4A}$, $AC_{4B}$ are expressed by Numerical Expression 3.

Figure 9:
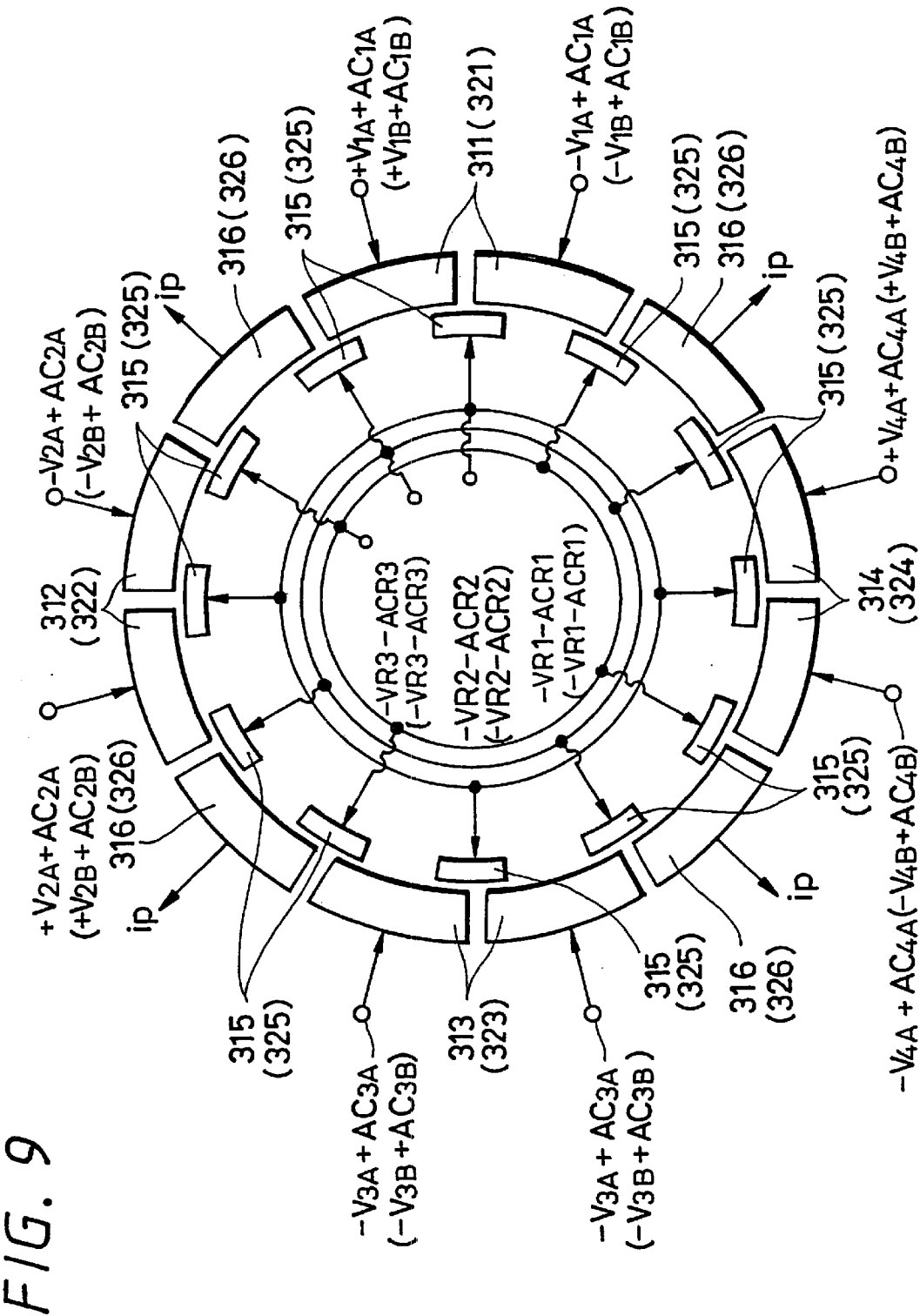
FIG. 9 is a diagram showing electrodes of the gyro apparatus and voltages applied to the electrodes according to the present invention.
Figure 10:
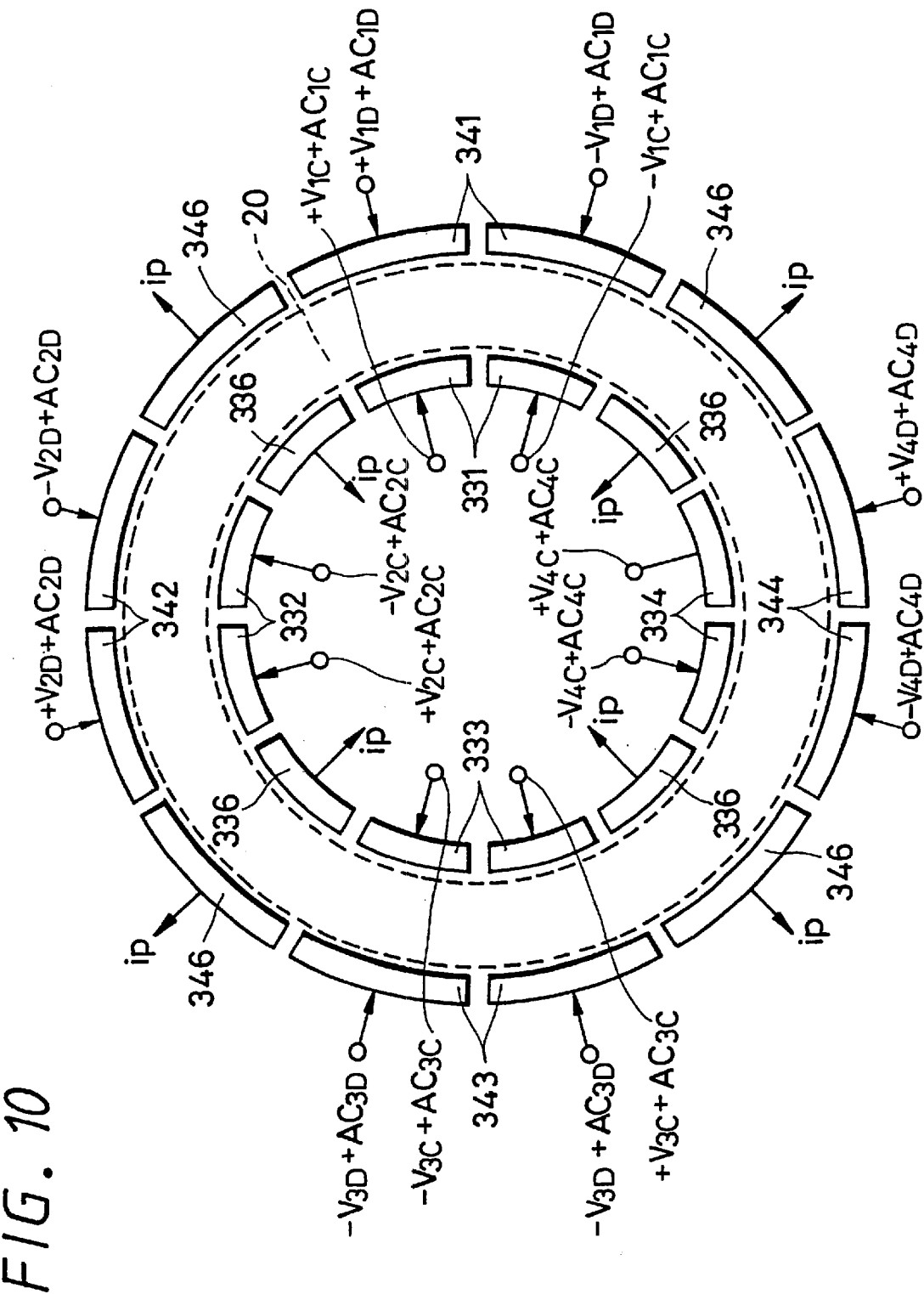
FIG. 10 is another diagram showing electrodes of the gyro apparatus and voltages applied to the electrodes according to the present invention.

Referring to FIGS. 9 and 10, voltage signals applied to the electrostatic supporting electrodes will be described. The control direct-current voltages and the displacement-detection alternating-current voltages are superimposed and applied to the electrostatic supporting electrodes. FIG. 9 shows the electrodes formed on the upper bottom member 22 of the gyro case and voltages applied to the electrodes; and the electrodes formed on the lower bottom member 24 of the gyro case and voltages applied to the electrodes are shown in parentheses. $+V_{1A}+AC_{1A}$ is applied to one of the X-axis electrostatic supporting electrodes 311, and $-V_{1A}+AC_{1A}$ is applied to the other; $+V_{2A}+AC_{2A}$ is applied to one of the Y-axis electrostatic supporting electrodes 312, and $-V_{2A}+AC_{2A}$ is applied to the other; $+V_{3A}+AC_{3A}$ is applied to one of the X-axis electrostatic supporting electrodes 313, and $-V_{3A}+AC_{3A}$ is applied to the other; and $+V_{4A}+AC_{4A}$ is applied to one of the Y-axis electrostatic supporting electrodes 314, and $-V_{4A}+AC_{4A}$ is applied to the other.

FIG. 10 shows the wall-like electrodes and voltages applied to the electrodes. $+V_{1C}+AC_{1C}$ is applied to one of the X-axis electrostatic supporting electrodes 331 provided on the inner circumference side of the gyro rotor 20, and $-V_{1C}+AC_{1C}$ is applied to the other; $+V_{2C}+AC_{2C}$ is applied to one of the Y-axis electrostatic supporting electrodes 332 provided on the above described side, and $-V_{2C}+AC_{2C}$ is applied to the other; $+V_{3C}+AC_{3C}$ is applied to one of the X-axis electrostatic supporting electrodes 333 provided on the above described side, and $-V_{3C}+AC_{3C}$ is applied to the other; and $+V_{4C}+AC_{4C}$ is applied to one of the Y-axis electrostatic supporting electrodes 334 provided on the above described side, and $-V_{4C}+AC_{4C}$ is applied to the other.

Further, $+V_{1D}+AC_{1D}$ is applied to one of the X-axis electrostatic supporting electrodes 341 provided on the outer circumference side of the gyro rotor 20, and $-V_{1D}+AC_{1D}$ is applied to the other; $+V_{2D}+AC_{2D}$ is applied to one of the Y-axis electrostatic supporting electrodes 342 provided on the above described side, and $-V_{2D}+AC_{2D}$ is applied to the other; $+V_{3D}+AC_{3D}$ is applied to one of the X-axis electrostatic supporting electrodes 343 provided on the above described side, and $-V_{3D}+AC_{3D}$ is applied to the other; and $+V_{4D}+AC_{4D}$ is applied to one of the Y-axis electrostatic supporting electrodes 344 provided at the above described side, and $-V_{4D}+AC_{4D}$ is applied to the other.

Figure 11:
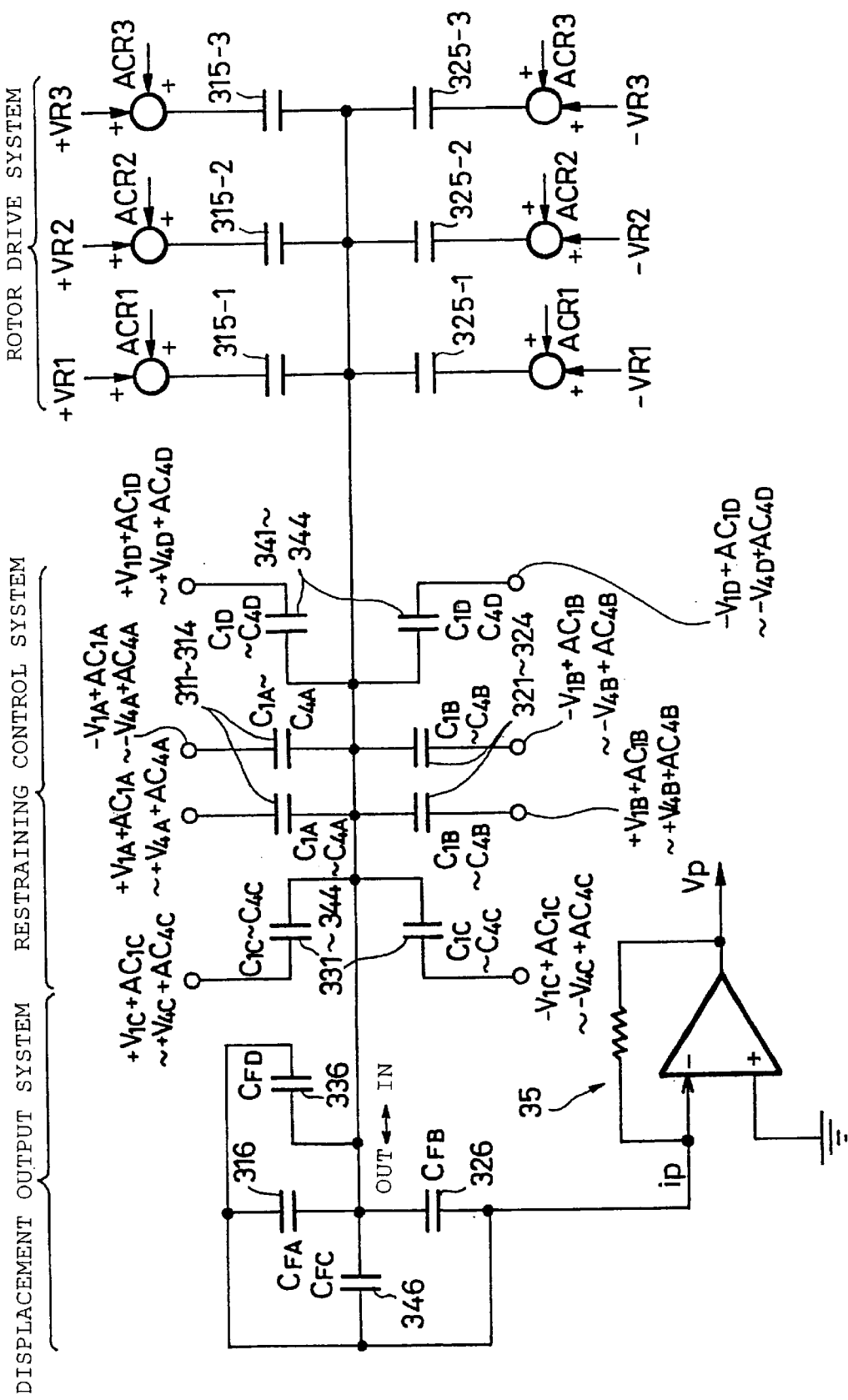
FIG. 11 is a diagram showing an equivalent circuit of a restraining control system and a rotor-driving control system of the gyro apparatus according to the present invention.

Referring to FIG. 11, the following description will be made. FIG. 11 shows an equivalent circuit of the gyro rotor 20 in the gyro apparatus according to the embodiment, and the electrodes which are provided corresponding to the rotor. The gyro rotor 20 and the electrodes provided corresponding to the rotor constitute capacitors. Therefore, the above equivalent circuit is obtained by substituting the capacitors for the gyro rotor 20 and the electrodes. As described referring to FIGS. 9 and 10, the control direct-current voltages $\pm V_{1A}$ through $\pm V_{4A}$, $\pm V_{1B}$ through $\pm V_{4B}$, $\pm V_{1C}$ through $\pm V_{4C}$, and $\pm V_{1D}$ through $\pm V_{4D}$, which have the equal magnitude and different polarities from each other, are applied to the individual pairs of the electrostatic supporting electrodes 311 through 314, 321 through 324, 331 through 334, 341 through 344. Therefore, the electric potentials at the middle points of the capacitors comprising individual pairs of electrostatic supporting electrodes are zero. Consequently, the electric potential of the gyro rotor 20 is invariably maintained at zero according to the embodiment.

The displacement-detection system according to the embodiment will be described, again referring to FIG. 8. A principle of the displacement-detection system according to the embodiment is the same as that of the conventional displacement-detection system described referring to FIG. 4. For example, it is assumed that the gyro rotor 20 is linearly displaced by $\Delta X$ in the X-axis direction, linearly displaced by $\Delta Y$ in the Y-axis direction, linearly displaced by $\Delta Z$ in the Z-axis direction, rotationally displaced by a rotating angle of $\Delta\theta$ around the Y-axis, and rotationally displaced by a rotating angle of $\Delta\phi$ around the X-axis. When it is supposed that such displacements are sufficiently small, the capacitances of individual capacitors are expressed as follows:

[Numerical Expression 18]

$$C_{1A}=C_0(1+\Delta Z+\Delta\theta)$$

$$C_{1B}=C_0(1-\Delta Z-\Delta\theta)$$

$$C_{2A}=C_0(1+\Delta Z+\Delta\phi)$$

$$C_{2B}=C_0(1-\Delta Z-\Delta\phi)$$

$$C_{3A}=C_0(1+\Delta Z-\Delta\theta)$$

$$C_{3B}=C_0(1-\Delta Z+\Delta\theta)$$

$$C_{4A}=C_0(1+\Delta Z-\Delta\phi)$$

$$C_{4B}=C_0(1-\Delta Z+\Delta\phi)$$

[Numerical Expression 19]

$$C_{1C}=C_{0r}(1-\Delta X)$$

$$C_{1D}=C_{0r}(1+\Delta X)$$

$$C_{2C}=C_{0r}(1-\Delta Y)$$

$$C_{2D}=C_{0r}(1+\Delta Y)$$

$$C_{3C}=C_{0r}(1+\Delta X)$$

$$C_{3D}=C_{0r}(1-\Delta X)$$

$$C_{4C}=C_{0r}(1+\Delta Y)$$

$$C_{4D}=C_{0r}(1-\Delta Y)$$

where $C_0$ is a capacitance of capacitors formed by the upper and lower electrostatic supporting electrodes and the gyro rotor 20, when all the displacements are zero. $C_{0r}$ is a capacitance of capacitors formed by the wall-like electrostatic supporting electrodes and the gyro rotor 20, when all the displacements are zero. According to the above expression, individual displacements $\Delta X$, $\Delta\theta$, and $\Delta Z$; and $\Delta Y$, $\Delta\phi$, and $\Delta Z$ are expressed with capacitances of the capacitors.

[Numerical Expression 20]

$$\Delta X=(\tfrac{1}{4}C_{0r})(-C_{1C}+C_{1D}+C_{3C}-C_{3D})$$

$$\Delta Y=(\tfrac{1}{4}C_{0r})(-C_{2C}+C_{2D}+C_{4C}-C_{4D})$$

$$\Delta Z=(\tfrac{1}{4}C_0)(C_{1A}-C_{1B}+C_{3A}-C_{3B})$$

$$=(\tfrac{1}{4}C_0)(C_{2A}-C_{2B}+C_{4A}-C_{4B})$$

$$\Delta\theta=(\tfrac{1}{4}C_0)(C_{1A}-C_{1B}-C_{3A}+C_{3B})$$

$$\Delta\phi=(\tfrac{1}{4}C_0)(C_{2A}-C_{2B}-C_{4A}+C_{4B})$$

A displacement-detection electric current $i_P$ is generated at the displacement-detection electrodes 316, 326, 336, 346 by applying displacement-detection alternating-current voltages $AC_{1A}$ through $AC_{4A}$, $AC_{1B}$ through $AC_{4B}$, $AC_{1C}$ through $AC_{4C}$, $AC_{1D}$ through $AC_{4D}$ to the electrostatic supporting electrodes 311 through 314, 321 through 324, 331 through 334, 341 through 344. When the gyro rotor 2 is linearly displaced by $\Delta X$ in the X-axis direction, linearly displaced by $\Delta Y$ in the Y-axis direction, linearly displaced by $\Delta Z$ in the Z-axis direction, rotationally displaced by a rotating angle of $\Delta\theta$ around the Y-axis, and rotationally displaced by a rotating angle of $\Delta\phi$ around the X-axis, a displacement-detection alternating-current $i_P$ is expressed by the following equation:

[Numerical Expression 21]

$$i_P = K(C_{1A}AC_{1A}+C_{1B}AC_{1B}$$

$$+C_{2A}AC_{2A}+C_{2B}AC_{2B}+C_{3A}$$

$$AC_{3A}+C_{3B}AC_{3B}+C_{4A}AC_{4A}$$

$$+C_{4B}AC_{4B}+C_{1C}AC_{1C}$$

$$+C_{1D}AC_{1D}+C_{2C}AC_{2C}$$

$$+C_{2D}AC_{2D}+C_{3C}$$

$$AC_{3C}+C_{3D}AC_{3D}+$$

$$C_{4C}AC_{4C}+C_{4D}AC_{4D})$$

$$K=2(C_{FA}+C_{FB}+C_{FC}$$

$$+C_{FD})s/(2C_{1A}+2C_{1B}$$

$$+2C_{2A}+2C_{2B}+2C_{3A}$$

$$+2C_{3B}+2C_{4A}+2C_{4B}$$

$$+2C_{1C}+2C_{1D}+2C_{2C}$$

$$+2C_{2D}+2C_{3C}+2C_{3D}$$

$$+2C_{4C}+C_{4D}+$$

$$C_{FA}+C_{FB}+C_{FC}+C_{FD})$$

where K describes a proportional constant, and s describes a Laplacian operator. $C_{FA}$ and $C_{FB}$ are capacitances of the capacitor formed by the upper and the lower displacement-detection electrodes 316, 326 and the gyro rotor 20; and $C_{FC}$, $C_{FD}$ are capacitances of the capacitor formed by the wall-like displacement-detection electrodes 336, 346 and the gyro rotor 20, respectively. When the Numerical Expressions 16 through 19 are substituted into individual terms on the right side of the expression, the following equation is obtained:
[Numerical Expression 22]

$$i_P = K_I(EX4C_{0r}\Delta X + EY4C_{0r}$$

$$\Delta Y + 2EZC_0\Delta Z + E\theta C_0\Delta\theta$$

$$+ E\phi C_0\Delta\phi)$$

$$K_I = -8s(C_{FA} + C_{FB} + C_{FC}$$

$$+ C_{FD})/\{16(C_0 + C_{0r}) +$$

$$C_{FA} + C_{FB} + C_{FC} + C_{FD}\}$$

The above displacement-detection alternating-current $i_P$ is supplied to the preamplifier 35 through a resistor 36 with a resistance value R, and converted into a displacement-detection alternating-current voltage $V_P$. Such displacement-detection alternating-current voltage $V_P$ is expressed by Numerical Expressions 9 and 10, both of which include all the linear displacements, and rotational displacements of the gyro rotor 20, that is, the linear displacements $\Delta X$, $\Delta Y$, $\Delta Z$, and the rotational displacements $\Delta\theta$, $\Delta\phi$.

The operation of the control operation unit 140 is similar to that of the conventional control operation unit 140 which has been described referring to FIG. 2. Specifically, the displacement-detection alternating-current voltage $V_P$ is input into the control operation unit 140 to calculate a control direct-current voltage. The control direct-current voltage is expressed by the following equation:
[Numerical Expression 23]

$$V_{1A} = V_0 + \Delta V_{1A}$$
$$V_{2A} = V_0 + \Delta V_{2A}$$
$$V_{3A} = V_0 + \Delta V_{3A}$$
$$V_{4A} = V_0 + \Delta V_{4A}$$
$$V_{1B} = V_0 + \Delta V_{1B}$$
$$V_{2B} = V_0 + \Delta V_{2B}$$
$$V_{3B} = V_0 + \Delta V_{3B}$$
$$V_{4B} = V_0 + \Delta V_{4B}$$
$$V_{1C} = V_0 + \Delta V_{1C}$$
$$V_{2C} = V_0 + \Delta V_{2C}$$
$$V_{3C} = V_0 + \Delta V_{3C}$$
$$V_{4C} = V_0 + \Delta V_{4C}$$
$$V_{1D} = V_0 + \Delta V_{1D}$$
$$V_{2D} = V_0 + \Delta V_{2D}$$
$$V_{3D} = V_0 + \Delta V_{3D}$$
$$V_{4D} = V_0 + \Delta V_{4D}$$

where $V_0$ is a reference voltage. The control operation unit 140 calculates dimensionless forces Fx, Fy, Fz, and torques T$\theta$, T$\phi$, based on the linear displacements $\Delta X$, $\Delta Y$, $\Delta Z$, and the rotational displacements $\Delta\theta$, $\Delta\phi$ of the gyro rotor 20. When eight changed amounts $\Delta V_{1A}$, $\Delta V_{1B}$ and $\Delta V_{3A}$, $\Delta V_{3B}$; and $\Delta V_{2A}$, $\Delta V_{2B}$ and $\Delta V_{4A}$, $\Delta V_{4B}$ of the control direct-current voltages are calculated based on dimensionless forces Fx, Fy, Fz and torques T$\theta$, T$\phi$, one condition is provided for the calculation as follows:
[Numerical Expression 24]

$$\Delta V_{1A} + \Delta V_{1B} + \Delta V_{3A} + \Delta V_{3B} = 0$$

$$\Delta V_{2A} + \Delta V_{2B} + \Delta V_{4A} + \Delta V_{4B} = 0$$

$$\Delta V_{1C} + \Delta V_{1D} + \Delta V_{3C} + \Delta V_{3D} = 0$$

$$\Delta V_{2C} + \Delta V_{2D} + \Delta V_{4C} + \Delta V_{4D} = 0$$

When the gyro rotor 20 is linearly and rotationally displaced, control direct-current voltages $\pm V_{1A}$ through $\pm V_{4A}$, $\pm V_{1B}$ through $\pm V_{4B}$, $\pm V_{1C}$ through $\pm V_{4C}$, and $\pm V_{1D}$ through $\Delta V_{4D}$, which are to be applied to the electrostatic supporting electrodes 311 through 314, 321 through 324, 331 through 334, 341 through 344 will change, whereby the electrostatic supporting forces are changed to return the gyro rotor 20 to the original position so that the deviation amount becomes zero.

As described above, the control loop or the restraining system according to the embodiment has an active configuration in which the deviation amount of the gyro rotor 20 is measured in actual practice, to actively change electrostatic forces so that the above deviation becomes zero.

Referring to FIGS. 8, 9, 10, and 11, a rotor drive system of the gyro apparatus according to the embodiment will be described. The rotor drive system according to the embodiment comprises: the rotor 20, twelve rotor driving electrodes 315 formed on the upper bottom member 22 of the gyro case, and twelve rotor driving electrodes 325 formed on the lower bottom member 24. As shown in FIG. 8, the rotor drive system according to the embodiment further comprises: the rotor driving unit 160 to which an output from the displacement-detection circuit 35 is input, thereby supplying a voltage signal to the rotor driving electrodes 315, 325, and the sequence control unit 170 which supplies instruction signals to the rotor driving unit 160. The sequence control unit 170 generates signals for activating, rotating, stopping, and the like, the rotor 20, and supplies the above instruction signals to the rotor driving unit 160 and the restraining control unit 150.

As shown in FIGS. 9 and 11, the driving direct-current voltages ±VR1, ±VR2, ±VR3, and the alternating-current voltages ACR1, ACR2, ACR3 for detecting rotational-angle are superimposed and then applied to the rotor driving electrodes 315, 325.

Figure 5:
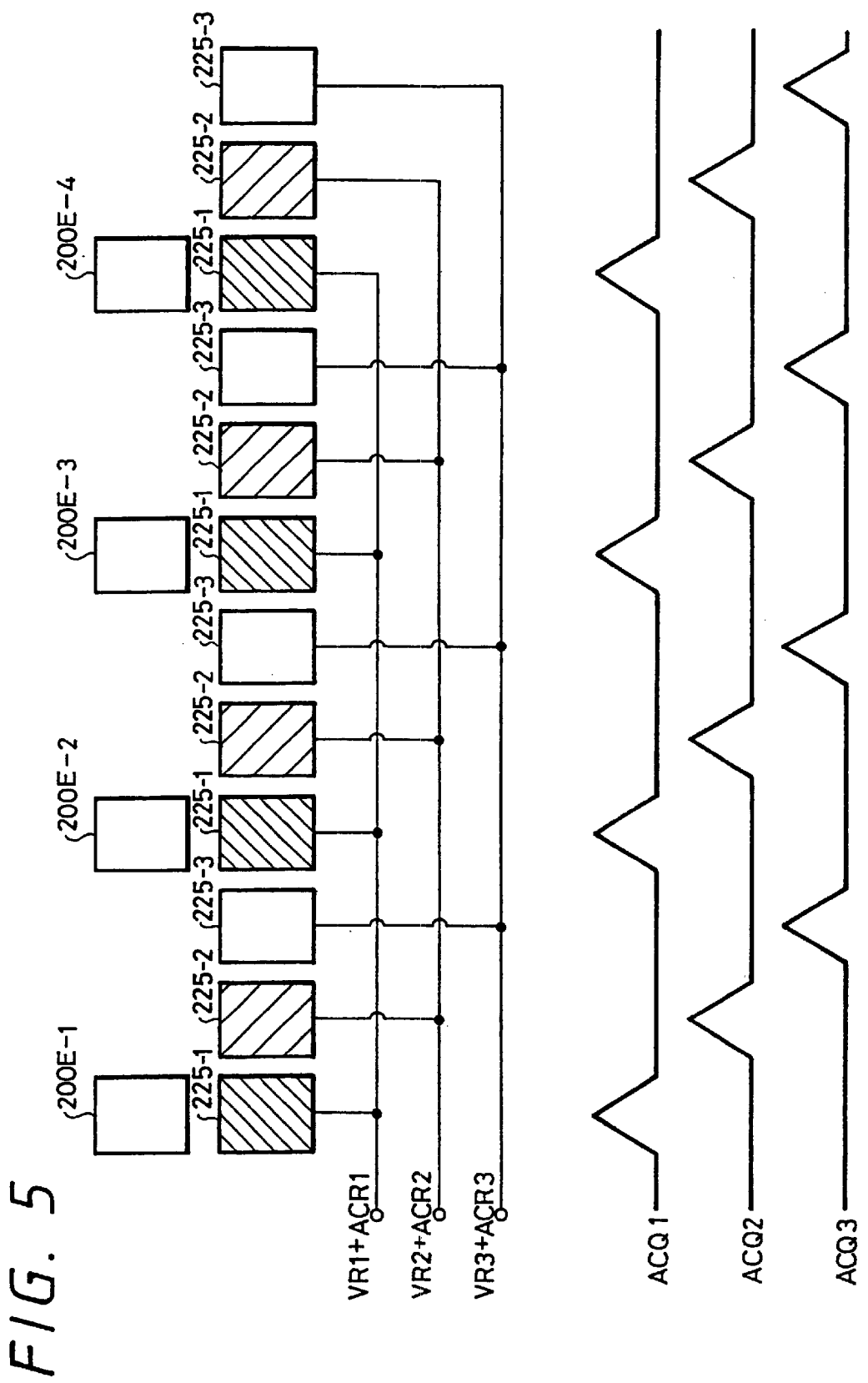
FIG. 5 is an explanatory diagram for describing the operation of the rotor drive system of the conventional gyro apparatus.
Figure 12:
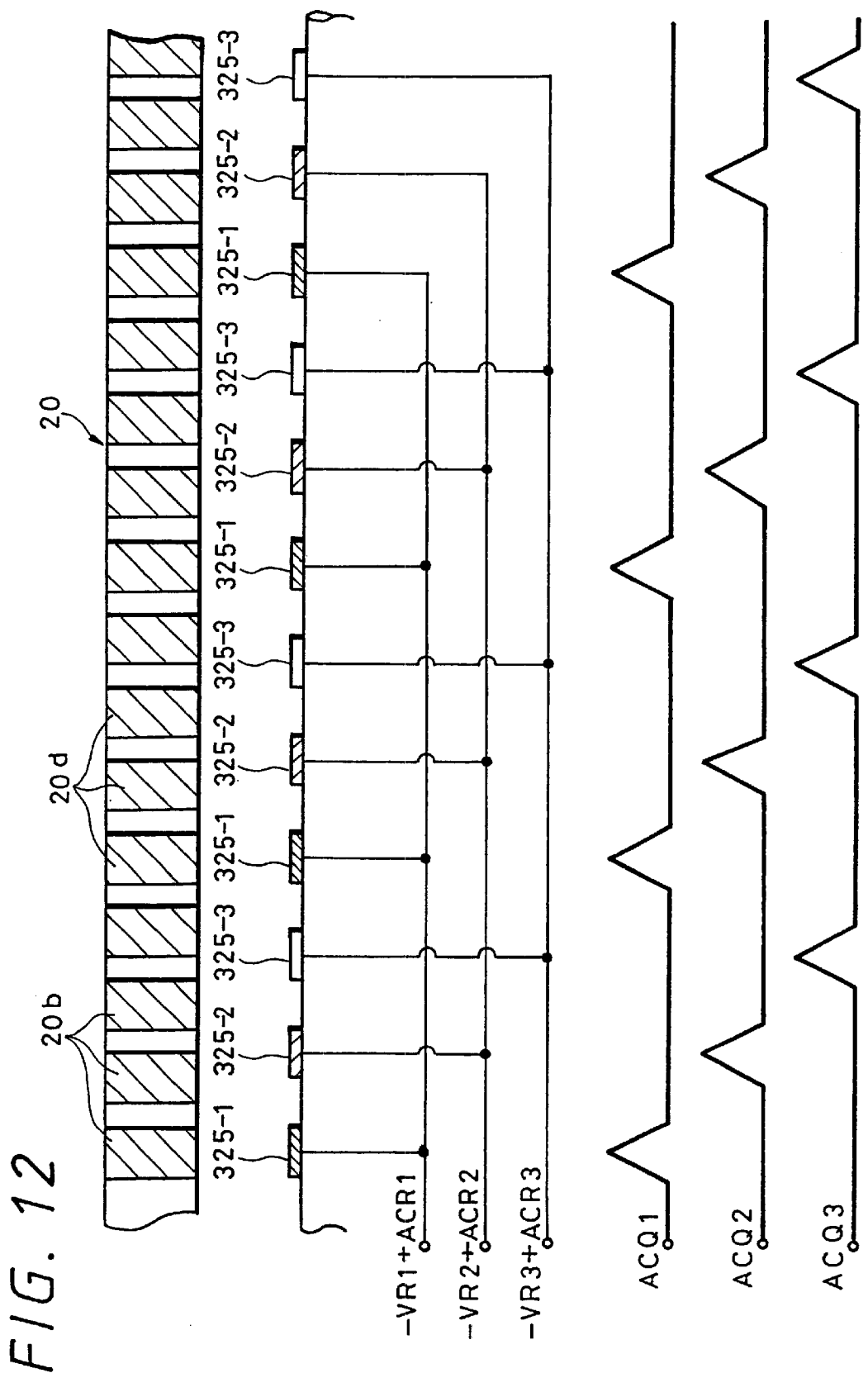
FIG. 12 is an explanatory diagram for describing operation of the rotor drive system of the gyro apparatus according to the present invention.

FIG. 12 shows cross sections of twelve lower rotor driving electrodes 325 disposed in a row, and of the gyro rotor 20 over the electrodes in a similar manner to that of FIG. 5. As shown in FIG. 7, fifteen holes 20b and fifteen lands 20d formed therebetween are formed in the gyro rotor 20.

The operation of the rotor drive system according to the embodiment is similar to that of the conventional rotor drive system which has been described referring to FIG. 5. Four first-phase driving electrodes 325-1 are electrically connected to each other, four second-phase driving electrodes 325-2 are electrically connected to each other, and four third-phase driving electrodes 325-3 are electrically connected to each other.

When the instruction signal from the sequence control unit 170 is supplied to the rotor driving unit 160, the driving direct-current voltages −VR1, −VR2, −VR3, and the detecting alternating-current voltages ACR1, ACR2, ACR3 are applied to the three-phase driving electrodes 325-1, 325-2, 325-3, respectively.

The driving direct-current voltages −VR1, −VR2, −VR3 are sequentially applied to the first, second, and third electrodes 325-1, 325-2, and 325-3 at every predetermined switching time Δt. Similarly, the voltages are applied to the twelve upper rotor driving electrodes 315, thereby, the gyro rotor 20 being rotated around the central axis, that is, around the spin axis by 360/12 degrees=30 degrees at every switching time Δt.

Waveforms ACQ1, ACQ2, ACQ3 shown in the lower part of FIG. 12 represent currents for detecting rotational-angle generated in the displacement-detection electrodes 316, 326, or rotational-angle detecting voltages corresponding to the currents. The rotational angle of the gyro rotor 20 is detected by such rotational-angle detecting signals ACQ1, ACQ2, ACQ3.

Further, in the case of three phases, in a similar manner to that of FIG. 5, the number of the rotor-driving electrodes 315, 325 is not limited to twelve, but the number maybe a multiple of three, for example, fifteen. Furthermore, the number of electrode portions which are provided on the gyro rotor 20 and comprise lands may be also a multiple of three, that is, twelve or fifteen.

As described above, embodiments according to the present invention have been described in detail, but the present invention is not limited to the above embodiments, it may be easily understood by those skilled in the art that various kinds of other configurations may be adopted without departing from the true spirit and scope of the present invention.

According to the present invention, since the annular gyro rotor is employed, the electrostatic supporting electrodes may be disposed in the up-and-down direction, and in the transverse direction, surrounding the gyro rotor. Therefore, there is an advantage that the magnitudes of the electrostatic supporting forces or restraining forces in the X-axis and Y-axis directions may be the same level as that of the electrostatic supporting force or restraining force in the Z-axis direction.

According to the present invention, there is another advantage that the accuracy and sensitivity of the restraining control in the X-axis and Y-axis directions may be the same level as that of the control in the Z-axis direction, since the magnitudes of the electrostatic supporting forces or restraining forces in the X-axis and Y-axis directions may be approximately the same as that of the electrostatic supporting force or restraining force in the Z-axis direction.

According to the present invention, since five signals, that is, acceleration in the X, Y, and Z directions, respectively, and rotational displacements around the X and Y axes may be obtained, there is further advantage that a device for measuring a position of moving bodies may be configured by disposing two gyro apparatuses according to the present invention at ninety degrees to each other, which has been conventionally configured by using six measuring devices in total, that is, three accelerometers for measuring acceleration in the X, Y, and Z directions, and three gyro apparatuses for detecting rotational displacements around the X, Y, and Z axes.

What is claimed is:

1. In an acceleration-detecting type gyro apparatus comprising:

a gyro case having a Z axis along the direction of a central axis, and X and Y axes perpendicular to the Z axis;

a gyro rotor supported within the gyro case by electrostatic supporting force such that the gyro rotor is not in contact with the gyro case, and having a spin axis in said central axis direction;

a plurality of electrostatic supporting electrodes spaced apart from the gyro rotor, and to which control voltages are applied;

a rotor drive system for rotating the gyro rotor around said spin axis at high speed;

a displacement-detection system for detecting linear displacements in the X-axis, Y-axis, and Z-axis directions, and rotational displacements around the Y and X axes of said gyro rotor; and a restraining control system including a feedback loop for correcting said control voltages so that displacements detected by the displacement-detection system become zero, the acceleration-detecting type gyro apparatus characterized in that said gyro rotor is annular-shaped, and said electrostatic supporting electrodes are disposed in the manner of surrounding the gyro rotor.

2. The gyro apparatus according to claim 1, wherein said gyro rotor is constituted to have a rectangular cross section formed of an upper surface, a lower surface, an inner circumference, and an outer circumference and said electrostatic supporting electrodes are provided in parallel to the upper surface, lower surface, inner circumference, and outer circumference of said gyro rotor.

3. The gyro apparatus according to claim 2, wherein said rotor drive system comprises a plurality of rotor-driving electrodes provided corresponding to the upper and lower surfaces of said gyro rotor, a plurality of concave portions are provided on the upper and lower surfaces of said gyro rotor, and land portions between the concave portions are provided corresponding to said rotor-driving electrodes.

4. The gyro apparatus according to claim 2, wherein said rotor drive system comprises a plurality of rotor-driving electrodes provided corresponding to the upper and lower surfaces of said gyro rotor, a plurality of through holes for connecting the upper surface and the lower surface are provided in said gyro rotor, and land portions between the through holes are provided corresponding to said rotor-driving electrodes.

5. The gyro apparatus according to claim 1, wherein said displacement-detection system comprises a plurality of displacement-detection electrodes spaced apart from said gyro rotor, the displacement-detection alternating-current voltages, which have been superimposed on said control voltages, are applied to said electrostatic supporting electrodes, and displacement-detection currents generated in said displacement-detection electrodes are detected by said displacement-detection alternating-current voltages, thereby calculating displacements of said gyro rotor.

6. The gyro apparatus according to claim 5, wherein a plurality of said displacement-detection alternating-current voltages are alternating-current voltages with different frequencies.

7. The gyro apparatus according to claim 5, wherein a plurality of said displacement-detection alternating-current voltages are alternating-current voltages having the same frequency with different phases.

* * * * *

UNITED STATES PATENT AND TRADEMARK OFFICE
CERTIFICATE OF CORRECTION

PATENT NO. : 6,668,648 B1
DATED : December 23, 2003
INVENTOR(S) : Karasawa et al.

It is certified that error appears in the above-identified patent and that said Letters Patent is hereby corrected as shown below:

<u>Title page,</u>
Item [22], PCT Filed, should read -- February 22, 2001 --.

Signed and Sealed this

Thirteenth Day of July, 2004

JON W. DUDAS
*Acting Director of the United States Patent and Trademark Office*